US012766803B2

(12) United States Patent
Wardlaw et al.

(10) Patent No.: US 12,766,803 B2
(45) Date of Patent: Oct. 20, 2026

(54) METHODS FOR MANUFACTURING CUSHIONING ELEMENTS FOR SPORTS APPAREL

(71) Applicant: adidas AG, Herzogenaurach (DE)

(72) Inventors: Angus Wardlaw, Nuremberg (DE); Gerd Rainer Manz, Oberreichenbach (DE); Tru Huu Minh Le, Erlangen (DE); Warren Freeman, Guangzhou (CN)

(73) Assignee: adidas AG, Herzogenaurach (DE)

( * ) Notice: Subject to any disclaimer, the term of this patent is extended or adjusted under 35 U.S.C. 154(b) by 53 days.

(21) Appl. No.: 18/590,691

(22) Filed: Feb. 28, 2024

(65) Prior Publication Data

US 2024/0278520 A1 Aug. 22, 2024

Related U.S. Application Data

(63) Continuation of application No. 17/384,557, filed on Jul. 23, 2021, now Pat. No. 11,945,184, which is a
(Continued)

(30) Foreign Application Priority Data

Feb. 13, 2013 (DE) ......................... 102013002519.2
Jan. 28, 2014 (EP) .................................... 14152903

(51) Int. Cl.
*B29C 43/04* (2006.01)
*A43B 13/18* (2006.01)
(Continued)

(52) U.S. Cl.
CPC .......... *B29D 35/142* (2013.01); *A43B 13/187* (2013.01); *A43D 29/00* (2013.01);
(Continued)

(58) Field of Classification Search
CPC ........ B29C 43/003; B29C 43/18; B29C 43/34
See application file for complete search history.

(56) References Cited

U.S. PATENT DOCUMENTS

D64,898 S 6/1924 Gunlock
1,855,098 A 4/1932 Collins
(Continued)

FOREIGN PATENT DOCUMENTS

AT 505333 A1 12/2008
CN 1034662 8/1989
(Continued)

OTHER PUBLICATIONS

Epoxy Resin, Wikipedia, Admitted Prior Art as of Mar. 13, 2025, 29 pages.
(Continued)

*Primary Examiner* — Edmund H Lee
(74) *Attorney, Agent, or Firm* — Kilpatrick Townsend & Stockton LLP

(57) ABSTRACT

Methods for manufacturing cushioning elements for sports apparel are described. A method is provided for manufacturing a cushioning element for sports apparel from randomly arranged particles of an expanded material. The method includes positioning a functional element within a mold and loading the mold with the particles of the expanded material, wherein the loading occurs through at least two openings within the mold and/or wherein the loading occurs between different movable parts of the mold.

16 Claims, 8 Drawing Sheets

Related U.S. Application Data continuation of application No. 16/353,374, filed on Mar. 14, 2019, now Pat. No. 11,135,797, which is a continuation of application No. 15/819,661, filed on Nov. 21, 2017, now Pat. No. 10,259,183, which is a continuation of application No. 15/452,793, filed on Mar. 8, 2017, now Pat. No. 9,849,645, which is a continuation of application No. 14/178,581, filed on Feb. 12, 2014, now Pat. No. 9,610,746.

(51) Int. Cl.

| | |
|---|---|
| ***A43D 29/00*** | (2006.01) |
| ***B29C 43/00*** | (2006.01) |
| ***B29C 43/18*** | (2006.01) |
| ***B29C 43/34*** | (2006.01) |
| ***B29C 67/20*** | (2006.01) |
| ***B29D 35/00*** | (2010.01) |
| ***B29D 35/12*** | (2010.01) |
| ***B29D 35/14*** | (2010.01) |
| ***C08J 9/228*** | (2006.01) |
| ***C08J 9/236*** | (2006.01) |
| *B29K 75/00* | (2006.01) |
| *B29K 675/00* | (2006.01) |
| *B29L 31/50* | (2006.01) |

(52) U.S. Cl.

CPC ............ *B29C 43/003* (2013.01); *B29C 43/04* (2013.01); *B29C 43/18* (2013.01); *B29C 43/34* (2013.01); *B29C 67/205* (2013.01); *B29D 35/0054* (2013.01); *B29D 35/0063* (2013.01); *B29D 35/128* (2013.01); *B29D 35/148* (2013.01); *C08J 9/228* (2013.01); *C08J 9/236* (2013.01); *B29C 2043/3455* (2013.01); *B29K 2075/00* (2013.01); *B29K 2675/00* (2013.01); *B29K 2905/00* (2013.01); *B29L 2031/504* (2013.01)

(56) References Cited

U.S. PATENT DOCUMENTS

| | | | | |
|---|---|---|---|---|
| 2,131,756 | A | 10/1938 | Roberts | |
| 2,787,809 | A | 4/1957 | Stastny | |
| 2,968,106 | A | 1/1961 | Joiner et al. | |
| 3,058,162 | A | 10/1962 | Grabowski | |
| 3,186,013 | A | 6/1965 | Glassman et al. | |
| 3,193,876 | A | 7/1965 | Thompson | |
| 3,315,317 | A | 4/1967 | Winkler | |
| 3,413,682 | A | 12/1968 | Roland | |
| 3,424,827 | A | 1/1969 | Galizia et al. | |
| 3,464,083 | A * | 9/1969 | Seymour | B29C 44/461 425/453 |
| 3,586,003 | A | 6/1971 | Baker | |
| 3,598,672 | A | 8/1971 | Heller | |
| 3,813,201 | A | 5/1974 | Frederick et al. | |
| D237,323 | S | 10/1975 | Inohara | |
| 3,971,839 | A * | 7/1976 | Taylor | B29C 67/00 264/126 |
| 4,035,216 | A | 7/1977 | Immel | |
| 4,132,016 | A | 1/1979 | Vaccari | |
| 4,298,324 | A | 11/1981 | Soulier | |
| 4,364,189 | A | 12/1982 | Bates | |
| 4,441,876 | A | 4/1984 | Marc | |
| 4,481,727 | A | 11/1984 | Stubblefield et al. | |
| 4,483,809 | A | 11/1984 | Ando et al. | |
| 4,524,529 | A | 6/1985 | Schaefer | |
| 4,546,559 | A | 10/1985 | Dassler et al. | |
| 4,624,062 | A | 11/1986 | Autry | |
| 4,642,911 | A | 2/1987 | Talarico et al. | |
| 4,658,515 | A | 4/1987 | Oatman et al. | |
| 4,667,423 | A | 5/1987 | Autry et al. | |
| D296,262 | S | 6/1988 | Brown et al. | |
| 4,754,561 | A | 7/1988 | Dufour et al. | |
| D302,898 | S | 8/1989 | Greenberg | |
| RE33,066 | E | 9/1989 | Stubblefield | |
| 4,864,739 | A | 9/1989 | Maestri et al. | |
| 4,902,721 | A | 2/1990 | Pham et al. | |
| 4,970,807 | A | 11/1990 | Anderie et al. | |
| 5,025,573 | A | 6/1991 | Giese et al. | |
| 5,082,436 | A | 1/1992 | Choi et al. | |
| 5,128,880 | A | 7/1992 | White | |
| D329,731 | S | 9/1992 | Adcock et al. | |
| 5,150,490 | A | 9/1992 | Busch et al. | |
| 5,156,754 | A | 10/1992 | Nomura et al. | |
| D333,556 | S | 3/1993 | Purdom | |
| 5,194,190 | A | 3/1993 | Kim | |
| D337,650 | S | 7/1993 | Thomas, III et al. | |
| 5,237,520 | A | 8/1993 | White | |
| D340,797 | S | 11/1993 | Pallera et al. | |
| 5,283,963 | A | 2/1994 | Lerner et al. | |
| 5,308,420 | A | 5/1994 | Yang et al. | |
| 5,314,927 | A | 5/1994 | Kondo et al. | |
| 5,319,866 | A | 6/1994 | Foley et al. | |
| D350,016 | S | 8/1994 | Passke et al. | |
| D350,222 | S | 9/1994 | Hase | |
| D356,438 | S | 3/1995 | Opie et al. | |
| 5,396,249 | A | 3/1995 | Yamada et al. | |
| 5,503,786 | A * | 4/1996 | Yang | B29C 44/06 264/46.4 |
| 5,518,060 | A | 5/1996 | Cleary et al. | |
| 5,528,842 | A | 6/1996 | Ricci et al. | |
| 5,549,743 | A | 8/1996 | Pearce | |
| D375,619 | S | 11/1996 | Backus et al. | |
| 5,617,650 | A | 4/1997 | Grim | |
| 5,667,737 | A | 9/1997 | Wittmann | |
| 5,692,319 | A | 12/1997 | Parker et al. | |
| 5,709,954 | A | 1/1998 | Lyden et al. | |
| D389,991 | S | 2/1998 | Elliott | |
| D390,349 | S | 2/1998 | Murai et al. | |
| 5,718,968 | A | 2/1998 | Cutler et al. | |
| D393,340 | S | 4/1998 | Doxey | |
| 5,736,167 | A | 4/1998 | Chang | |
| D395,337 | S | 6/1998 | Greene | |
| D408,618 | S | 4/1999 | Wilborn et al. | |
| D408,971 | S | 5/1999 | Birkenstock | |
| D413,010 | S | 8/1999 | Birkenstock | |
| 5,937,265 | A | 8/1999 | Pratt et al. | |
| D414,920 | S | 10/1999 | Cahill | |
| D415,610 | S | 10/1999 | Cahill | |
| D415,876 | S | 11/1999 | Cahill | |
| 5,996,252 | A | 12/1999 | Cougar | |
| 6,014,821 | A | 1/2000 | Yaw | |
| 6,041,521 | A | 3/2000 | Wong | |
| 6,042,764 | A | 3/2000 | Eder et al. | |
| D422,400 | S | 4/2000 | Brady et al. | |
| D423,199 | S | 4/2000 | Cahill | |
| 6,086,808 | A | 7/2000 | Sorensen et al. | |
| 6,108,943 | A | 8/2000 | Hudson et al. | |
| D431,346 | S | 10/2000 | Birkenstock | |
| 6,132,663 | A * | 10/2000 | Johnson | B29D 35/128 36/137 |
| 6,165,300 | A | 12/2000 | Elsner et al. | |
| 6,253,159 | B1 | 6/2001 | Bett et al. | |
| 6,346,210 | B1 | 2/2002 | Swartz et al. | |
| D460,852 | S | 7/2002 | Daudier | |
| 6,432,320 | B1 | 8/2002 | Bonsignore et al. | |
| 6,464,922 | B1 | 10/2002 | Bogdan | |
| 6,516,540 | B2 | 2/2003 | Seydel et al. | |
| 6,702,469 | B1 | 3/2004 | Taniguchi et al. | |
| D490,222 | S | 5/2004 | Burg et al. | |
| D490,230 | S | 5/2004 | Mervar | |
| D492,099 | S | 6/2004 | McClaskie | |
| 6,782,640 | B2 | 8/2004 | Westin et al. | |
| 6,796,056 | B2 | 9/2004 | Swigart | |
| 6,800,227 | B1 | 10/2004 | Nohara et al. | |
| D498,901 | S | 11/2004 | Hawker et al. | |
| 6,925,734 | B1 | 8/2005 | Schaeffer et al. | |
| 6,948,263 | B2 | 9/2005 | Covatch | |
| 6,957,504 | B2 | 10/2005 | Morris | |
| 6,968,637 | B1 | 11/2005 | Johnson et al. | |
| D517,302 | S | 3/2006 | Ardissono | |

(56) References Cited

U.S. PATENT DOCUMENTS

| | | | |
|---|---|---|---|
| D538,518 S | | 3/2007 | Della Valle |
| 7,202,284 B1 | | 4/2007 | Limerkens et al. |
| D554,848 S | | 11/2007 | Marston |
| D560,883 S | | 2/2008 | McClaskie |
| D561,433 S | | 2/2008 | McClaskie |
| D561,438 S | | 2/2008 | Belley |
| D561,986 S | | 2/2008 | Horne et al. |
| D570,581 S | | 6/2008 | Moretti |
| D571,085 S | | 6/2008 | McClaskie |
| D572,462 S | | 7/2008 | Hatfield et al. |
| 7,421,805 B2 | | 9/2008 | Geer et al. |
| D586,090 S | | 2/2009 | Turner et al. |
| D589,690 S | | 4/2009 | Truelsen |
| D594,187 S | | 6/2009 | Hickman |
| D596,384 S | | 7/2009 | Andersen et al. |
| D601,333 S | | 10/2009 | McClaskie |
| D606,733 S | | 12/2009 | McClaskie |
| D607,190 S | | 1/2010 | McClaskie |
| D611,233 S | | 3/2010 | Della Valle et al. |
| 7,673,397 B2 | | 3/2010 | Jarvis |
| D616,183 S | | 5/2010 | Skaja |
| D617,540 S | | 6/2010 | McClaskie |
| D618,891 S | | 7/2010 | McClaskie |
| 7,854,071 B2 | | 12/2010 | Goonetilleke et al. |
| D631,646 S | | 2/2011 | Müller |
| D633,286 S | | 3/2011 | Skaja |
| D633,287 S | | 3/2011 | Skaja |
| D634,918 S | | 3/2011 | Katz et al. |
| D636,156 S | | 4/2011 | Della Valle et al. |
| D636,569 S | | 4/2011 | McMillan |
| D636,571 S | | 4/2011 | Avar |
| 7,941,941 B2 | | 5/2011 | Hazenberg et al. |
| D641,142 S | | 7/2011 | Lindseth et al. |
| D644,827 S | | 9/2011 | Lee |
| D645,649 S | | 9/2011 | McClaskie |
| D648,105 S | | 11/2011 | Schlageter et al. |
| D650,159 S | | 12/2011 | Avar |
| 8,082,684 B2 | | 12/2011 | Munns |
| D655,488 S | | 3/2012 | Blakeslee |
| D659,364 S | | 5/2012 | Jolicoeur |
| D680,725 S | | 4/2013 | Avar et al. |
| D680,726 S | | 4/2013 | Propét |
| D683,116 S | | 5/2013 | Petrie |
| 8,479,412 B2 | | 7/2013 | Peyton et al. |
| 8,490,297 B2 | | 7/2013 | Guerra |
| D693,553 S | | 11/2013 | McClaskie |
| D695,501 S | | 12/2013 | Yehudah |
| D698,137 S | | 1/2014 | Carr |
| D707,934 S | | 7/2014 | Petrie |
| D709,680 S | | 7/2014 | Herath |
| 8,834,770 B2 | | 9/2014 | Nakano et al. |
| 8,922,641 B2 | | 12/2014 | Bertin et al. |
| D721,478 S | | 1/2015 | Avent et al. |
| 8,958,901 B2 | | 2/2015 | Regan |
| 8,961,844 B2 | * | 2/2015 | Baghdadi ............... A43B 13/18 264/109 |
| 9,010,157 B1 | | 4/2015 | Podhajny et al. |
| D739,129 S | | 9/2015 | Del Biondi |
| D739,131 S | | 9/2015 | Del Biondi |
| D740,003 S | | 10/2015 | Herath |
| D740,004 S | | 10/2015 | Hoellmueller et al. |
| 9,167,868 B1 | | 10/2015 | Koo et al. |
| 9,167,869 B2 | | 10/2015 | Koo et al. |
| 9,212,270 B2 | | 12/2015 | Künkel et al. |
| D758,056 S | | 6/2016 | Herath et al. |
| 9,498,927 B2 | | 11/2016 | Watkins et al. |
| D776,410 S | | 1/2017 | Herath et al. |
| D783,264 S | | 4/2017 | Hoellmueller et al. |
| 9,610,746 B2 | | 4/2017 | Wardlaw et al. |
| 9,781,970 B2 | | 10/2017 | Wardlaw et al. |
| 9,781,974 B2 | | 10/2017 | Reinhardt |
| 9,788,598 B2 | | 10/2017 | Reinhardt |
| 9,788,606 B2 | | 10/2017 | Reinhardt |
| 9,820,528 B2 | * | 11/2017 | Reinhardt ............... B29C 67/04 |
| 9,849,645 B2 | | 12/2017 | Wardlaw et al. |
| 10,013,711 B2 | | 7/2018 | Gooch et al. |
| D828,686 S | | 9/2018 | Hoellmueller et al. |
| 10,259,183 B2 | | 4/2019 | Wardlaw et al. |
| 10,357,904 B2 | | 7/2019 | Farris et al. |
| 10,506,846 B2 | | 12/2019 | Wardlaw et al. |
| D875,359 S | | 2/2020 | Dobson et al. |
| 10,716,358 B2 | * | 7/2020 | Reinhardt .............. A43B 13/04 |
| 10,943,284 B2 | | 3/2021 | Gooch et al. |
| 10,974,476 B2 | | 4/2021 | Le et al. |
| 11,832,688 B2 | | 12/2023 | Druskin et al. |
| 12,408,730 B1 | | 9/2025 | Holan et al. |
| 12,570,062 B2 | | 3/2026 | Hartmann et al. |
| 2001/0013459 A1 | | 8/2001 | Pattantyus-Abraham et al. |
| 2001/0048182 A1 | | 12/2001 | Caretta et al. |
| 2002/0025998 A1 | | 2/2002 | Mccullough et al. |
| 2002/0162247 A1 | | 11/2002 | Hokkirigawa et al. |
| 2002/0170650 A1 | | 11/2002 | Chi |
| 2003/0131501 A1 | | 7/2003 | Erickson et al. |
| 2003/0172548 A1 | | 9/2003 | Fuerst |
| 2003/0208925 A1 | | 11/2003 | Pan |
| 2003/0232933 A1 | | 12/2003 | Lagneaux et al. |
| 2004/0030435 A1 | | 2/2004 | Popp et al. |
| 2004/0032042 A1 | | 2/2004 | Chi |
| 2004/0053032 A1 | * | 3/2004 | Weingartner ........... B29B 17/04 425/140 |
| 2004/0211088 A1 | | 10/2004 | Volkart |
| 2004/0222554 A1 | | 11/2004 | Akopyan |
| 2004/0232583 A1 | | 11/2004 | Monsheimer et al. |
| 2005/0065270 A1 | | 3/2005 | Knoerr et al. |
| 2005/0108898 A1 | | 5/2005 | Jeppesen et al. |
| 2005/0110183 A1 | | 5/2005 | Buchel et al. |
| 2005/0116372 A1 | | 6/2005 | Bruning et al. |
| 2005/0144034 A1 | | 6/2005 | Hunter |
| 2005/0150132 A1 | | 7/2005 | Iannacone |
| 2005/0241181 A1 | | 11/2005 | Cheng |
| 2006/0010717 A1 | | 1/2006 | Finkelstein |
| 2006/0026863 A1 | | 2/2006 | Liu |
| 2006/0043645 A1 | | 3/2006 | Goettsch et al. |
| 2006/0083912 A1 | | 4/2006 | Park et al. |
| 2006/0125134 A1 | | 6/2006 | Lin et al. |
| 2006/0156579 A1 | | 7/2006 | Hoffer et al. |
| 2006/0235095 A1 | | 10/2006 | Leberfinger et al. |
| 2006/0283046 A1 | | 12/2006 | Mason |
| 2007/0029698 A1 | | 2/2007 | Rynerson et al. |
| 2007/0193070 A1 | | 8/2007 | Bertagna et al. |
| 2007/0199213 A1 | | 8/2007 | Campbell et al. |
| 2007/0295451 A1 | | 12/2007 | Willis |
| 2008/0052965 A1 | | 3/2008 | Sato et al. |
| 2008/0060221 A1 | | 3/2008 | Hottinger et al. |
| 2008/0224357 A1 | | 9/2008 | Allmendinger |
| 2008/0244932 A1 | | 10/2008 | Nau et al. |
| 2008/0250666 A1 | | 10/2008 | Votolato |
| 2008/0277837 A1 | | 11/2008 | Liu et al. |
| 2008/0282579 A1 | | 11/2008 | Bobbett et al. |
| 2009/0013558 A1 | | 1/2009 | Hazenberg et al. |
| 2009/0025260 A1 | | 1/2009 | Nakano |
| 2009/0072436 A1 | | 3/2009 | Dean |
| 2009/0113758 A1 | | 5/2009 | Nishiwaki et al. |
| 2009/0119023 A1 | | 5/2009 | Zimmer et al. |
| 2009/0142563 A1 | | 6/2009 | Zorn et al. |
| 2009/0217550 A1 | | 9/2009 | Koo et al. |
| 2009/0235557 A1 | | 9/2009 | Christensen et al. |
| 2009/0277047 A1 | | 11/2009 | Moretti |
| 2009/0320330 A1 | | 12/2009 | Borel et al. |
| 2010/0063778 A1 | | 3/2010 | Schrock et al. |
| 2010/0122472 A1 | | 5/2010 | Wilson, III et al. |
| 2010/0154257 A1 | | 6/2010 | Bosomworth et al. |
| 2010/0218397 A1 | | 9/2010 | Nishiwaki et al. |
| 2010/0222442 A1 | * | 9/2010 | Prissok ................ A43B 13/023 521/56 |
| 2010/0239803 A1 | | 9/2010 | Farkas et al. |
| 2010/0242309 A1 | | 9/2010 | McCann |
| 2010/0267850 A1 | | 10/2010 | Yoshida |
| 2010/0287788 A1 | | 11/2010 | Spanks et al. |
| 2010/0287795 A1 | | 11/2010 | Van Niekerk |
| 2010/0293811 A1 | | 11/2010 | Truelsen |
| 2011/0047720 A1 | | 3/2011 | Maranan et al. |
| 2011/0067272 A1 | | 3/2011 | Lin |
| 2011/0232008 A1 | | 9/2011 | Crisp |

(56) References Cited

U.S. PATENT DOCUMENTS

| | | | |
|---|---|---|---|
| 2011/0232135 | A1 | 9/2011 | Dean et al. |
| 2011/0252668 | A1 | 10/2011 | Chen et al. |
| 2011/0266717 | A1 | 11/2011 | Nehls et al. |
| 2011/0283560 | A1 | 11/2011 | Portzline et al. |
| 2011/0297590 | A1 | 12/2011 | Ackley et al. |
| 2011/0302805 | A1 | 12/2011 | Vito |
| 2012/0005920 | A1 | 1/2012 | Alvear et al. |
| 2012/0047770 | A1 | 3/2012 | Dean et al. |
| 2012/0056345 | A1 | 3/2012 | Lee |
| 2012/0177777 | A1 | 7/2012 | Brown et al. |
| 2012/0205435 | A1 | 8/2012 | Woerz et al. |
| 2012/0233877 | A1 | 9/2012 | Swigart et al. |
| 2012/0233883 | A1 | 9/2012 | Spencer et al. |
| 2012/0235322 | A1 | 9/2012 | Greene et al. |
| 2012/0266490 | A1 | 10/2012 | Atwal et al. |
| 2012/0304491 | A1 | 12/2012 | Kimura et al. |
| 2013/0125319 | A1 | 5/2013 | Regan |
| 2013/0126075 | A1 | 5/2013 | Jiang |
| 2013/0150468 | A1 | 6/2013 | Füssi et al. |
| 2013/0203879 | A1 | 8/2013 | Rensen |
| 2013/0255103 | A1 | 10/2013 | Dua et al. |
| 2013/0266792 | A1 | 10/2013 | Nohara et al. |
| 2013/0267639 | A1 | 10/2013 | Zhuang et al. |
| 2013/0269215 | A1 | 10/2013 | Smirman et al. |
| 2013/0291409 | A1* | 11/2013 | Reinhardt ............... B29C 67/04 36/43 |
| 2013/0333950 | A1 | 12/2013 | Atkins et al. |
| 2014/0017450 | A1* | 1/2014 | Baghdadi .............. B29C 44/445 264/109 |
| 2014/0033573 | A1 | 2/2014 | Wills |
| 2014/0066530 | A1 | 3/2014 | Shen et al. |
| 2014/0075787 | A1 | 3/2014 | Cartagena |
| 2014/0110491 | A1 | 4/2014 | Roberts, Jr. |
| 2014/0189964 | A1 | 7/2014 | Wen et al. |
| 2014/0197253 | A1 | 7/2014 | Lofts et al. |
| 2014/0223673 | A1 | 8/2014 | Wardlaw et al. |
| 2014/0223776 | A1 | 8/2014 | Wardlaw et al. |
| 2014/0223777 | A1 | 8/2014 | Whiteman et al. |
| 2014/0223783 | A1 | 8/2014 | Wardlaw et al. |
| 2014/0227505 | A1 | 8/2014 | Schiller et al. |
| 2014/0243442 | A1 | 8/2014 | Coles et al. |
| 2014/0259753 | A1 | 9/2014 | Watkins et al. |
| 2014/0275306 | A1 | 9/2014 | Watkins et al. |
| 2014/0366403 | A1 | 12/2014 | Reinhardt et al. |
| 2014/0366404 | A1 | 12/2014 | Reinhardt et al. |
| 2014/0366405 | A1 | 12/2014 | Reinhardt et al. |
| 2014/0373392 | A1 | 12/2014 | Cullen |
| 2015/0038605 | A1 | 2/2015 | Baghdadi |
| 2015/0076236 | A1 | 3/2015 | Chen |
| 2015/0082668 | A1 | 3/2015 | Nakaya et al. |
| 2015/0089841 | A1 | 4/2015 | Smaldone et al. |
| 2015/0101133 | A1 | 4/2015 | Manz et al. |
| 2015/0119482 | A1 | 4/2015 | Kumar et al. |
| 2015/0166270 | A1 | 6/2015 | Buscher et al. |
| 2015/0174808 | A1 | 6/2015 | Rudolph et al. |
| 2015/0190830 | A1 | 7/2015 | Regan et al. |
| 2015/0197617 | A1 | 7/2015 | Prissok et al. |
| 2015/0237823 | A1 | 8/2015 | Schmitt et al. |
| 2015/0344661 | A1 | 12/2015 | Spies et al. |
| 2015/0351493 | A1 | 12/2015 | Ashcroft et al. |
| 2015/0366289 | A1 | 12/2015 | Rustam et al. |
| 2016/0001476 | A1 | 1/2016 | Sommer et al. |
| 2016/0015120 | A1 | 1/2016 | Denison et al. |
| 2016/0037859 | A1 | 2/2016 | Smith et al. |
| 2016/0039162 | A1 | 2/2016 | Murphy et al. |
| 2016/0044992 | A1 | 2/2016 | Reinhardt et al. |
| 2016/0046751 | A1 | 2/2016 | Spies et al. |
| 2016/0121524 | A1 | 5/2016 | Däschlein et al. |
| 2016/0125499 | A1 | 5/2016 | Gooch et al. |
| 2016/0128426 | A1 | 5/2016 | Reinhardt et al. |
| 2016/0200011 | A1 | 7/2016 | Rothfuss et al. |
| 2016/0227876 | A1 | 8/2016 | Le et al. |
| 2016/0244583 | A1 | 8/2016 | Keppeler |
| 2016/0244584 | A1 | 8/2016 | Keppeler |
| 2016/0244587 | A1 | 8/2016 | Gutmann et al. |
| 2016/0278481 | A1 | 9/2016 | Le et al. |
| 2016/0295955 | A1 | 10/2016 | Wardlaw et al. |
| 2016/0302508 | A1 | 10/2016 | Kormann et al. |
| 2016/0311993 | A1 | 10/2016 | Zhang et al. |
| 2016/0332379 | A1 | 11/2016 | Paternoster et al. |
| 2016/0346627 | A1 | 12/2016 | Le et al. |
| 2017/0015825 | A1 | 1/2017 | Ting et al. |
| 2017/0173910 | A1 | 6/2017 | Wardlaw et al. |
| 2017/0253710 | A1 | 9/2017 | Smith et al. |
| 2017/0259474 | A1 | 9/2017 | Holmes et al. |
| 2017/0340067 | A1 | 11/2017 | Dyckmans et al. |
| 2017/0341325 | A1 | 11/2017 | Le et al. |
| 2017/0341326 | A1 | 11/2017 | Holmes et al. |
| 2017/0341327 | A1 | 11/2017 | Le et al. |
| 2018/0035755 | A1 | 2/2018 | Reinhardt et al. |
| 2018/0071980 | A1 | 3/2018 | Lomasney et al. |
| 2018/0154598 | A1 | 6/2018 | Kurtz et al. |
| 2018/0206591 | A1 | 7/2018 | Whiteman et al. |
| 2018/0235310 | A1 | 8/2018 | Wardlaw et al. |
| 2018/0290349 | A1 | 10/2018 | Kirupanantham et al. |
| 2018/0303198 | A1 | 10/2018 | Reinhardt et al. |
| 2019/0021435 | A1 | 1/2019 | Kormann et al. |
| 2020/0044326 | A1 | 2/2020 | Olfert et al. |
| 2020/0307041 | A1 | 10/2020 | Reuber |
| 2022/0250138 | A1 | 8/2022 | Moodie et al. |
| 2023/0201912 | A1 | 6/2023 | Pedmo et al. |
| 2023/0248110 | A1 | 8/2023 | Levine |
| 2024/0389886 | A1 | 11/2024 | Maresca |

FOREIGN PATENT DOCUMENTS

| | | | |
|---|---|---|---|
| CN | 1036128 | | 10/1989 |
| CN | 1087573 | A | 6/1994 |
| CN | 2501679 | Y | 7/2002 |
| CN | 2511160 | | 9/2002 |
| CN | 1451332 | | 10/2003 |
| CN | 2722676 | | 9/2005 |
| CN | 2796454 | | 7/2006 |
| CN | 2888936 | | 4/2007 |
| CN | 101003679 | | 7/2007 |
| CN | 101060963 | A | 10/2007 |
| CN | 101190049 | | 6/2008 |
| CN | 201223028 | | 4/2009 |
| CN | 101484035 | | 7/2009 |
| CN | 101611082 | A | 12/2009 |
| CN | 101611950 | | 12/2009 |
| CN | 202233324 | | 5/2012 |
| CN | 202635746 | | 1/2013 |
| CN | 202895563 | U | 4/2013 |
| CN | 202907958 | | 5/2013 |
| CN | 103371564 | | 10/2013 |
| CN | 103507208 | A | 1/2014 |
| CN | 203692653 | | 7/2014 |
| CN | 103978620 | A | 8/2014 |
| CN | 203828180 | | 9/2014 |
| CN | 104302456 | A | 1/2015 |
| CN | 105209233 | A | 12/2015 |
| CN | 205021904 | U | 2/2016 |
| CN | 105520278 | A | 4/2016 |
| CN | 205291380 | U | 6/2016 |
| CN | 108472843 | A | 8/2018 |
| CN | 109318487 | A | 2/2019 |
| CN | 110831733 | A | 2/2020 |
| DE | 1704502 | A1 | 5/1971 |
| DE | 1729011 | A1 | 6/1971 |
| DE | 3032246 | A1 | 4/1982 |
| DE | 3229762 | A1 | 2/1983 |
| DE | 3437786 | A1 | 4/1986 |
| DE | 3605662 | | 6/1987 |
| DE | 4236081 | | 4/1994 |
| DE | 29520911 | U1 | 6/1996 |
| DE | 19633467 | A1 | 2/1998 |
| DE | 19648804 | A1 | 5/1998 |
| DE | 19654860 | A1 | 5/1998 |
| DE | 19652690 | | 6/1998 |
| DE | 19704700 | C1 | 9/1998 |
| DE | 19860611 | C1 | 3/2000 |
| DE | 19950121 | | 11/2000 |
| DE | 10010182 | | 9/2001 |

(56) References Cited

FOREIGN PATENT DOCUMENTS

| | | | |
|---|---|---|---|
| DE | 10117979 | A1 | 8/2002 |
| DE | 202004003679 | U1 | 5/2004 |
| DE | 102004049060 | A1 | 6/2005 |
| DE | 10244433 | | 12/2005 |
| DE | 102004028462 | A1 | 12/2005 |
| DE | 10244435 | | 2/2006 |
| DE | 102004063803 | | 7/2006 |
| DE | 202006009569 | U1 | 8/2006 |
| DE | 102005050411 | | 4/2007 |
| DE | 202007006164 | | 9/2007 |
| DE | 102006024940 | A1 | 12/2007 |
| DE | 202008017042 | | 4/2009 |
| DE | 102007054723 | A1 | 5/2009 |
| DE | 102008020890 | | 10/2009 |
| DE | 102009030678 | A1 | 4/2010 |
| DE | 102009004386 | | 7/2010 |
| DE | 202010008893 | | 1/2011 |
| DE | 112009001291 | | 4/2011 |
| DE | 202011109598 | U1 | 2/2012 |
| DE | 102010052783 | | 5/2012 |
| DE | 202012005735 | | 8/2012 |
| DE | 102011108744 | | 1/2013 |
| DE | 102012206094 | | 10/2013 |
| DE | 102013012515 | A1 | 3/2014 |
| DE | 102013002519 | A1 | 8/2014 |
| DE | 102013208170 | | 11/2014 |
| DE | 102013108053 | A1 | 1/2015 |
| DE | 102013221018 | A1 | 4/2015 |
| DE | 102013221020 | A1 | 4/2015 |
| DE | 102014107847 | A1 | 12/2015 |
| DE | 102014216992 | A1 | 3/2016 |
| DE | 102015202013 | A1 | 8/2016 |
| DE | 102015202014 | A1 | 8/2016 |
| DE | 102015224885 | A1 | 6/2017 |
| DE | 102020110352 | A1 | 10/2020 |
| EM | 001286116-0001 | | 7/2011 |
| EM | 001286116-0002 | | 7/2011 |
| EM | 001286116-0003 | | 7/2011 |
| EM | 001286116-0004 | | 7/2011 |
| EM | 001286116-0005 | | 7/2011 |
| EM | 001286116-0006 | | 7/2011 |
| EP | 165353 | | 12/1985 |
| EP | 0455835 | A1 | 11/1991 |
| EP | 0578272 | A1 | 1/1994 |
| EP | 752216 | | 1/1997 |
| EP | 0790010 | A1 | 8/1997 |
| EP | 0792593 | A2 | 9/1997 |
| EP | 873061 | | 10/1998 |
| EP | 0976518 | A2 | 2/2000 |
| EP | 1016354 | A1 | 7/2000 |
| EP | 1197159 | A1 | 4/2002 |
| EP | 1259365 | A1 | 11/2002 |
| EP | 1424105 | B1 | 6/2004 |
| EP | 1197159 | | 9/2004 |
| EP | 1535714 | A2 | 6/2005 |
| EP | 1854620 | | 11/2007 |
| EP | 1872924 | | 1/2008 |
| EP | 1990170 | A2 | 11/2008 |
| EP | 2110037 | | 10/2009 |
| EP | 2233021 | | 9/2010 |
| EP | 2250917 | | 11/2010 |
| EP | 2316293 | | 5/2011 |
| EP | 2342986 | | 7/2011 |
| EP | 2446768 | | 5/2012 |
| EP | 2564719 | A1 | 3/2013 |
| EP | 2649896 | | 10/2013 |
| EP | 2684665 | A2 | 1/2014 |
| EP | 2540184 | | 7/2014 |
| EP | 2764972 | A1 | 8/2014 |
| EP | 2767181 | A1 | 8/2014 |
| EP | 2786670 | A1 | 10/2014 |
| EP | 2792261 | | 10/2014 |
| EP | 2845504 | A1 | 3/2015 |
| EP | 2848144 | | 3/2015 |
| EP | 2862467 | A1 | 4/2015 |
| EP | 2865289 | A1 | 4/2015 |
| EP | 2939558 | | 11/2015 |
| EP | 2984956 | A1 | 2/2016 |
| EP | 3053732 | A1 | 8/2016 |
| EP | 3067100 | | 9/2016 |
| EP | 2649896 | A2 | 10/2016 |
| EP | 3114954 | A1 | 1/2017 |
| EP | 2767183 | B1 | 4/2017 |
| EP | 3488723 | A1 | 5/2019 |
| FR | 1484844 | A | 6/1967 |
| FR | 2683432 | | 5/1993 |
| GB | 1063353 | A | 3/1967 |
| GB | 1248314 | A | 9/1971 |
| GB | 1275095 | | 5/1972 |
| GB | 1417522 | A | 12/1975 |
| GB | 1439101 | A | 6/1976 |
| GB | 2258801 | | 2/1993 |
| JP | S48-045560 | | 6/1973 |
| JP | S48-042216 | | 12/1973 |
| JP | S49-020266 | | 5/1974 |
| JP | S50-155569 | A | 12/1975 |
| JP | 54-114354 | A | 9/1979 |
| JP | 55-129004 | A | 10/1980 |
| JP | 56-020402 | A | 2/1981 |
| JP | S56-77122 | A | 6/1981 |
| JP | S57-005009 | U | 1/1982 |
| JP | H57-180653 | A | 11/1982 |
| JP | H58-021304 | U | 2/1983 |
| JP | S58-142828 | A | 8/1983 |
| JP | S60-500491 | A | 4/1985 |
| JP | S61-041402 | A | 2/1986 |
| JP | S63-074629 | A | 4/1988 |
| JP | 01274705 | | 11/1989 |
| JP | 6046483 | | 6/1994 |
| JP | H06-218830 | A | 8/1994 |
| JP | H06-305039 | A | 11/1994 |
| JP | H07-059368 | B2 | 6/1995 |
| JP | H07-186151 | A | 7/1995 |
| JP | 08052761 | A | 2/1996 |
| JP | H08-131209 | A | 5/1996 |
| JP | H08-239570 | A | 9/1996 |
| JP | 3047622 | U | 9/1997 |
| JP | H09-322803 | A | 12/1997 |
| JP | H10-058475 | A | 3/1998 |
| JP | H10-138252 | A | 5/1998 |
| JP | 10152575 | | 6/1998 |
| JP | 11129275 | A | 5/1999 |
| JP | 2913603 | | 6/1999 |
| JP | 11-291275 | | 10/1999 |
| JP | 2000-037208 | A | 2/2000 |
| JP | 2000-190394 | A | 7/2000 |
| JP | 2000197503 | | 7/2000 |
| JP | 2000-279205 | A | 10/2000 |
| JP | 2002-119302 | A | 4/2002 |
| JP | 2002-144366 | A | 5/2002 |
| JP | 2002-325602 | | 11/2002 |
| JP | 2002361749 | | 12/2002 |
| JP | 2003-135105 | A | 5/2003 |
| JP | 2003-310302 | A | 11/2003 |
| JP | 2003-311800 | A | 11/2003 |
| JP | 2005218543 | | 8/2005 |
| JP | 2006-137032 | | 6/2006 |
| JP | 2007-504977 | A | 3/2007 |
| JP | 2008073548 | | 4/2008 |
| JP | 2008-544009 | A | 12/2008 |
| JP | 2009-518495 | A | 5/2009 |
| JP | 2009-535157 | | 10/2009 |
| JP | 2012-504024 | A | 2/2012 |
| JP | 2012-249744 | | 12/2012 |
| JP | 2014-158708 | S | 9/2014 |
| JP | 2014-531352 | A | 11/2014 |
| KR | 950016606 | * | 7/1995 |
| KR | 1020100032561 | A | 3/2010 |
| KR | 1020110049293 | | 5/2011 |
| KR | 20160037252 | A | 4/2016 |
| TW | 201012407 | | 4/2010 |
| WO | 8906501 | | 7/1989 |
| WO | 94/020568 | A1 | 9/1994 |
| WO | 1994020568 | | 9/1994 |

(56) References Cited

FOREIGN PATENT DOCUMENTS

| | | | |
|---|---|---|---|
| WO | 99/55186 | A1 | 11/1999 |
| WO | 2001/064414 | A1 | 9/2001 |
| WO | 2002/004188 | A1 | 1/2002 |
| WO | 2005026243 | | 3/2005 |
| WO | 2005066250 | | 7/2005 |
| WO | 2006015440 | | 2/2006 |
| WO | 2006034807 | | 4/2006 |
| WO | 2007082838 | | 7/2007 |
| WO | 2008047538 | | 4/2008 |
| WO | 2008087078 | | 7/2008 |
| WO | 2009/036240 | A1 | 3/2009 |
| WO | 2009095935 | | 8/2009 |
| WO | 2010010010 | | 1/2010 |
| WO | 2010037028 | | 4/2010 |
| WO | 2010045144 | | 4/2010 |
| WO | 2010136398 | | 12/2010 |
| WO | 2011/125540 | A1 | 10/2011 |
| WO | 2011134996 | | 11/2011 |
| WO | 2012065926 | | 5/2012 |
| WO | 2013013784 | | 1/2013 |
| WO | 2013168256 | | 11/2013 |
| WO | 2014046940 | | 3/2014 |
| WO | 2014/150122 | A2 | 9/2014 |
| WO | 2015052265 | | 4/2015 |
| WO | 2015052267 | | 4/2015 |
| WO | 2015075546 | | 5/2015 |
| WO | 2016/023067 | A1 | 2/2016 |
| WO | 2016/030026 | A1 | 3/2016 |
| WO | 2016/030333 | A1 | 3/2016 |

OTHER PUBLICATIONS

Material Data Sheet—PET, Admitted Prior Art as of Mar. 13, 2025, 2 pages.

Material Data Sheet—POM, Admitted Prior Art as of Mar. 13, 2025, 2 pages.

Office Action, German Patent Application No. 102013022415.2, Jan. 27, 2023, 11 pages.

"New Concept of Green", Zhongguancun Promotion Center for International Environmental Protection Industry et al., Beijing, 2004, 8 pages.

Dieter , "Materials Selection and Design", ASM Handbook, vol. 20, Available Online at: https://app.knovel.com/hotlink/toc/id:kpASMHVMS2/asm-handbook-volume-20/asm-handbook-volume-20, 1997.

Office Action, Japanese Patent Application No. 2020-109299, Aug. 3, 2021, 4 pages.

Corrected Notice of Allowance, U.S. Appl. No. 16/353,374, filed Aug. 30, 2021, 2 pages.

European Patent Application No. 20169850.3, European Search Report, Sep. 24, 2020, 6 pages.

"Colour and Additive Preparations for Extruded Polyolefin Foams", Gabriel-Chemie Group, available at www.gabriel-chemie.com/downloads/folder/PE%20foams_en.pdf, last accessed on Jan. 17, 2017, 20 pages.

http://www.dow.com/polyethylene/na/en/fab/foaming.htm, Dec. 7, 2011, 1 page.

https://www.britannica.com/print/article/463684, Aug. 17, 2016.

U.S. Appl. No. 15/093,233, Unpublished (filed Apr. 28, 2017)—stored in USPTO.

U.S. Appl. No. 15/452,793 , Non-Final Office Action, Jul. 3, 2017, 6 pages.

U.S. Appl. No. 15/452,793, Notice of Allowance, Aug. 15, 2017, 5 pages.

U.S. Appl. No. 15/581,112, Unpublished (filed Apr. 28, 2017)—stored in USPT-O.

U.S. Appl. No. 29/591,016, Unpublished (filed Jan. 16, 2017)—stored in USPTO.

U.S. Appl. No. 29/592,935, Unpublished (filed Feb. 3, 2017)—stored in USPTO.

U.S. Appl. No. 29/592,946, Unpublished (filed Feb. 3, 2017)—stored in USPTO.

U.S. Appl. No. 29/594,228, Unpublished (filed Feb. 16, 2017)—stored in USPTO.

U.S. Appl. No. 29/594,358, Unpublished (filed Feb. 17, 2017)—stored in USPTO.

U.S. Appl. No. 29/595,852, Unpublished (filed Mar. 2, 2017)—stored in USPTO.

U.S. Appl. No. 29/595,857, Unpublished (filed Mar. 2, 2017)—stored in USPTO.

U.S. Appl. No. 29/595,859, Unpublished (filed Mar. 2, 2017)—stored in USPTO.

U.S. Appl. No. 29/614,532, Unpublished (filed Aug. 21, 2017)—stored in USPTO.

U.S. Appl. No. 29/614,545, Unpublished (filed Aug. 21, 2017)—stored in USPTO.

U.S. Appl. No. 62/137,139, Unpublished (filed Mar. 23, 2016)—stored in USPTO.

Amesöder et al., "The right turn (part 1)—Determination of Characteristic values for assembly injection", Journal of Plastics Technology, Apr. 2008, pp. 1-8 (EnglishTranslation of Abstract provided).

Azo Materials , "BASF Develops Expanded Thermoplastic Polyurethane", available http://www.azom.com/news.aspxNewsID=37360, Jul. 2, 2013, 4 pages.

Baur et al., "Saechtling Kunststoff Taschenbuch", Hanser Verlag, 31st Ausgabe, Oct. 2013, 18 pages (9 pages for the original document and 9 pages for the English translation).

Nauta , "Stabilisation of Low Density, Closed Cell Polyethylene Foam", University of Twente, Netherlands, 2000, 148 pages.

Office Action from corresponding German Patent Application No. 102013022415.2, Apr. 4, 2017, 10 pages.

Venable LLP , Letter, Jan. 14, 2016, 6 pages.

Office Action, Japanese Patent Application No. 2018-115698, Sep. 17, 2019, 10 pages.

U.S. Appl. No. 14/178,581, Non-Final Office Action, Jun. 24, 2016, 5 pages.

U.S. Appl. No. 14/178,581, Notice of Allowance, Dec. 23, 2016, 5 pages.

U.S. Appl. No. 14/178,581, Notice of Allowance, Oct. 19, 2016, 5 pages.

U.S. Appl. No. 15/819,661, Final Office Action, Nov. 5, 2018, 6 pages.

U.S. Appl. No. 15/819,661, Non-Final Office Action, Jun. 25, 2018, 8 pages.

U.S. Appl. No. 15/819,661, Notice of Allowance, Dec. 4, 2018, 5 pages.

European Patent Application No. 14152903.2 , European Extended Search Report, Sep. 5, 2014, 8 pages.

European Patent Application No. 16181829.9, European Extended Search Report, Dec. 8, 2016, 8 pages.

European Patent Application No. 14152903.2, Office Action, Jul. 23, 2018, 5 pages.

Japanese Patent Application No. 2014-020968, Office Action, Nov. 7, 2017, 11 pages.

European Patent Application No. 14152903.2, Summons to Attend Oral Hearing, May 31, 2019, 6 pages.

U.S. Appl. No. 29/664,097, filed Sep. 21, 2018, Unpublished—stored in USPTO.

U.S. Appl. No. 16/680,852, filed Nov. 12, 2019, Unpublished—stored in USPTO.

U.S. Appl. No. 29/663,342, filed Sep. 13, 2018, Unpublished—stored in USPTO.

U.S. Appl. No. 29/691,166, filed May 14, 2019, Unpublished—stored in USPTO.

U.S. Appl. No. 29/643,233, filed Apr. 5, 2018 , Unpublished—stored in USPTO.

U.S. Appl. No. 29/641,371, filed Mar. 21, 2018, Unpublished—stored in USPTO.

U.S. Appl. No. 29/663,029, filed Sep. 11, 2018, Unpublished—stored in USPTO.

U.S. Appl. No. 29/641,256, filed Mar. 20, 2018, Unpublished—stored in USPTO.

(56) References Cited

OTHER PUBLICATIONS

U.S. Appl. No. 29/641,223, filed Mar. 20, 2018, Unpublished—stored in USPTO.
U.S. Appl. No. 29/697,489, filed Jul. 9, 2019, Unpublished—stored in USPTO.
U.S. Appl. No. 29/691,854, filed May 20, 2019, Unpublished—stored in USPTO.
U.S. Appl. No. 29/719,889, filed Jan. 8, 2020, Unpublished—stored in USPTO.
U.S. Appl. No. 29/679,962, filed Feb. 12, 2019, Unpublished—stored in USPTO.
U.S. Appl. No. 29/693,455, filed Jun. 3, 2019, Unpublished—stored in USPTO.
U.S. Appl. No. 16/465,485, filed May 30, 2019, Unpublished—stored in USPTO.
U.S. Appl. No. 29/706,274, filed Sep. 19, 2019, Unpublished—stored in USPTO.
U.S. Appl. No. 29/721,029, filed Jan. 17, 2020, Unpublished—stored in USPTO.
German Patent Application No. 102013022415.2, Office Action, Feb. 15, 2021, 9 pages.
Non-Final Office Action, U.S. Appl. No. 16/353,374, mailed Feb. 11, 2021, 9 pages.
Notice of Allowance, U.S. Appl. No. 16/353,374, mailed May 19, 2021, 5 pages.
Sun, "From Cardiac Electricity Vector to Cardiac Electromagnetic", Tianjin Science and Technology Press, Aug. 2013, p. 250.
Ma et al., "Modern Engineering Materials Handbook", National Defense Industry Press, May 2005, p. 953-954.
Guangchuan, "New Technology in Food Industry and Application Thereof", China Light Industry Press, Oct. 31, 1995, p. 16.
Shaoxun, "Sports Shoes Design", China Light Industry Press, Jan. 2007, p. 82.
Yang, "Sports Shoes Design Materials", China Fortune Press, Aug. 2014, pp. 57-58.
Non-Final Office Action, U.S. Appl. No. 17/384,557, mailed Jul. 26, 2023, 8 pages.
Notice of Allowance, U.S. Appl. No. 17/384,557, mailed Nov. 29, 2023, 5 pages.
Shiyanjun et al., "Research on the Progress of Modern Materials Science", 2019, 9 pages.
Office Action, Japanese Patent Application No. 2025-003033, Feb. 17, 2026, 17 pages.

* cited by examiner

METHODS FOR MANUFACTURING CUSHIONING ELEMENTS FOR SPORTS APPAREL

CROSS REFERENCE TO RELATED APPLICATIONS

This application is a continuation of U.S. patent application Ser. No. 17/384,557, filed Jul. 23, 2021, entitled METHODS FOR MANUFACTURING CUSHIONING ELEMENTS FOR SPORTS APPAREL ("the '557 application"), which is a continuation of U.S. patent application Ser. No. 16/353,374, filed Mar. 14, 2019, now U.S. Pat. No. 11,135,797, issued Oct. 5, 2021, entitled METHODS FOR MANUFACTURING CUSHIONING ELEMENTS FOR SPORTS APPAREL ("the '374 application"), which is a continuation of U.S. patent application Ser. No. 15/819,661, filed Nov. 21, 2017, now U.S. Pat. No. 10,259,183, issued Apr. 16, 2019, entitled METHODS FOR MANUFACTURING CUSHIONING ELEMENTS FOR SPORTS APPAREL ("the '661 application"), which is a continuation of U.S. patent application Ser. No. 15/452,793, filed Mar. 8, 2017, now U.S. Pat. No. 9,849,645, issued Dec. 26, 2017, entitled METHODS FOR MANUFACTURING CUSHIONING ELEMENTS FOR SPORTS APPAREL ("the '793 application"), which is a continuation application of U.S. patent application Ser. No. 14/178,581, filed on Feb. 12, 2014, now U.S. Pat. No. 9,610,746, issued Apr. 4, 2017, entitled METHODS FOR MANUFACTURING CUSHIONING ELEMENTS FOR SPORTS APPAREL ("the '581 application"), which is related to and claims priority benefits from German Patent Application No. DE 10 2013 002 519.2, filed on Feb. 13, 2013, entitled METHODS FOR MANUFACTURING CUSHIONING ELEMENTS FOR SPORTS APPAREL ("the '519 application"), and from European Patent Application No. EP 14 152 903.2, filed on Jan. 28, 2014, entitled METHODS FOR MANUFACTURING CUSHIONING ELEMENTS FOR SPORTS APPAREL ("the '903 application"). The '557, '374, '661, '793, '581, '519, and '903 applications are hereby incorporated herein in their entireties by this reference.

FIELD OF THE INVENTION

The present invention relates to methods for manufacturing cushioning elements for sports apparel, in particular for sports shoes.

BACKGROUND

Cushioning elements are of great importance in the area of sports apparel and are used in clothing for a large variety of sports. Examples in this case are winter sports apparel, running apparel, outdoor apparel, football apparel, golf apparel, combat sports apparel, or the like. In general, these cushioning elements serve the protection of the wearer from knocks and blows and for padding, for example in the event of the wearer falling. For this, cushioning elements typically contain one or more deformation elements, which deform under external pressure or impact and thus absorb the impact energy.

The cushioning elements play a very important role in the construction of shoes, in particular sports shoes. With the aid of cushioning elements that are arranged as soles or parts of soles, shoes are provided with a range of different characteristics that may be pronounced in various strengths depending on the special type of shoe. Primarily, the shoe soles have a protective function. By way of their increased stiffness in comparison to the shoe upper, they protect the foot of the respective wearer from injury through sharp objects on which the shoe wearer treads. Furthermore, the shoe sole protects the shoe from excessive wear generally by means of an increased abrasion resistance. In addition, shoe soles may increase the grip of a shoe on the respective ground and thus facilitate faster movement. It may be a further function of a shoe sole to provide a certain stability. In addition to this, for example, a shoe sole may act as a cushion in order to cushion the forces that occur when the shoe impacts the ground. Finally, a shoe sole may protect the foot from dirt or water spray and/or provide a number of other functionalities.

In order to satisfy the wealth of functionalities, different materials and manufacturing methods are known in the prior art from which cushioning elements may be made for sports apparel.

As examples, reference is made to cushioning elements that are arranged as shoe soles made out of ethylene vinyl acetate (EVA), thermoplastic polyurethane (TPU), rubber, polypropylene (PP) or polystyrene (PS). Each of these different materials provides a special combination of different characteristics that are more or less well suited for soles of specific shoe types depending on the specific requirements of the respective shoe type. For example, TPU is very resistant to abrasion and tear-proof. Furthermore, EVA distinguishes itself by having high stability and relatively good cushioning characteristics.

Further, the use of expanded materials was taken into consideration for manufacturing a shoe sole. Expanded thermoplastic polyurethane (eTPU) is known in particular from WO 2008/087078, WO 2007/082838, WO 2010/136398 and WO 2005/066250. Expanded thermoplastic polyurethane distinguishes itself through low weight and particularly good elasticity and cushioning characteristics. Furthermore, according to WO 2005/066250, a sole made of expanded thermoplastic polyurethane may be affixed to a shoe upper without additional adhesive agents.

EP 1 854 620 A1 teaches a method for filling cavities with foam particles. DE 20 2008 017 042 U1 discloses a shaping tool for the manufacture of foamed components made from particles of a synthetic material with a partially closed surface. DE 42 36 081 A1 describes a method for the manufacture of components from foamed synthetic materials and a mold for performing such a method. DE 196 52 690 A1 describes a component, method for the manufacture and apparatus for performing the method. DE 20 2010 008 893 U1 discloses an apparatus for the manufacture of a particle foam component.

For the manufacture of particles from expanded thermoplastic urethane, thermoplastic urethane is for example first of all loaded with a foaming agent in a suspension process or an extrusion process, which then leads to a foaming of the thermoplastic urethane. For example, thermoplastic urethane may initially be stored in water, so that water is absorbed by the thermoplastic urethane, which is evaporated in a further step in order to obtain expanded thermoplastic urethane.

It is known from the prior art to produce different components for the manufacture of soles for shoes, for example, midsole parts out of EVA, torsion elements out of TPU, outsoles out of rubber, viscous cushioning elements out of modified EVA, etc., which are then assembled into a shoe sole in a further manufacturing step.

A disadvantage of the manufacturing methods known from the prior art is that these contain the manufacture of different individual parts of the cushioning element, as just described, which subsequently need to be connected to each other. This means a considerable additional expenditure, since for example different molds are used for manufacturing the individual parts, the individual parts respectively need to be released from these molds and inserted into new molds and the possibilities of exerting influence upon the characteristics of the cushioning elements during the manufacturing process are generally limited.

On the basis of the prior art, it is thus an object of the present invention to provide improved manufacturing methods for cushioning elements for sports apparel. In particular, it is an object of the present invention to provide manufacturing methods for cushioning elements for sports apparel that increase the possibilities of exerting influence upon the characteristics of the cushioning element during its manufacturing process, to reduce the number of manufacturing steps and to simplify the manufacturing process and enable a largely automated manufacture.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In accordance with various embodiments of the present invention, a method for manufacturing a cushioning element for sports apparel from randomly arranged particles of an expanded material, which comprises loading a mold with the particles of the expanded material, wherein the particles are loaded into the mold within a stream of a transport liquid and/or a stream of steam.

The use of particles from expanded material significantly facilitates the manufacturing process for cushioning elements, since these are particularly easily stored and handled. Through loading the mold with the particles with the aid of a liquid flow and/or a steam flow, it is also guaranteed that the particles fill the mold as evenly as possible, without an additional distribution of the particles being necessary within the mold. This reduces the risk of flaws occurring in the material of the cushioning element and permits a considerable simplification of the manufacturing process.

In certain embodiments, the particles of the expanded material are treated with pressure and/or heat and/or steam within the mold.

Hereby, the particles of the expanded material bond, for instance in that at least the surfaces of the particles melt and merge with one another. In certain embodiments, the particles undergo chemical bonding by means of the pressure and/or heat and/or steam treatment. Such a bond is particularly durable and lasting and makes it possible to do without the use of additional binding agent such as adhesives. Furthermore, by varying the parameters of the pressure and/or heat and/or steam treatment, such as the pressure, the temperature, the duration of the treatment, etc., it is possible to influence the characteristics of the cushioning element during the manufacture.

In further embodiments, the particles of the expanded material are loaded into the mold under pressure.

As a result, the particles are compressed already during the introduction into the mold and permits an additional manufacturing step in which the particles are compressed in the mold only after having been loaded into the mold. Through variation of the pressure with which the particles are loaded into the mold, the density of the material of the cushioning element to be manufactured may be further influenced, for example.

In further embodiments, the transport liquid is at least partially removed from the mold before the treatment with pressure and/or heat and/or steam.

In some embodiments, the remaining transport liquid solidifies in the mold, preferably under the influence of the pressure and/or heat and/or steam treatment. Therefore, the transport liquid may assume further functions in the manufacture of a cushioning element and further influence the characteristics of the cushioning element, which again leads to a considerable simplification in the manufacturing process. The solidified liquid may, for example, increase the stability of the cushioning element and its tear strength, which permits for example the manufacture of very thin and light weight cushioning elements.

In further embodiments, the liquid and/or the solidified liquid is at least partially dissolved out and/or melted out and/or removed by pressure from the cushioning element after conclusion of the pressure and/or heat and/or steam treatment.

As a result, further reduction of the density and thus the weight of the cushioning element is permitted.

Further embodiments of the present invention comprise a method for manufacturing a cushioning element for sports apparel from randomly arranged particles of an expanded material, which comprises loading a mold with the particles of the expanded material. The method further comprises heating at least a part of the wall of the mold to a temperature that will cause the particles of the expanded material adjacent to this part of the wall of the mold to melt either partially or entirely.

Through the at least partial melting of the expanded material adjacent to the wall of the mold already inside the mold, characteristics of the surface of the cushioning element may be further influenced without the need for an additional manufacturing step.

In some embodiments, the particles of the expanded material are further treated with pressure and/or heat and/or steam within the mold.

In further embodiments, said part of the wall of the mold, which is heated in accordance with the above described method, has a structured surface.

This may, for example, serve as optical design. In the case of a cushioning element designed as a shoe sole, the structure of the surface may for example be designed as a profile for the sole, which increases traction.

In some embodiments, the at least partially melted particles are so constituted after cooling that they selectively stiffen the cushioning element.

Through the partial melting and cooling, the density and/or the stiffness of the partially melted particles on the surface may, for example, be increased in comparison to the non-melted particles on the inside of the cushioning element. Furthermore, the surface may be additionally structured, for example grid shaped or honeycomb shaped or rib shaped, which may increase the stiffness of the cushioning element selectively in one or more directions.

According to further embodiments of the present invention, a method for manufacturing a cushioning element for sports apparel from randomly arranged particles of an expanded material comprises loading of a mold with the particles of the expanded material and the coating of the particles with a liquid matrix material, in order to achieve a substantially even distribution of the particles in the matrix material.

In certain embodiments, the particles of the expanded material and/or the matrix material are further treated with pressure and/or heat and/or steam.

The coating of the particles with the liquid matrix material represents a further possibility to achieve an even distribution of the particles. Simultaneously, the matrix material may assume a whole range of additional functions. For example, the matrix material may thus solidify under the influence of the pressure and/or heat and/or steam treatment and confer a greater tear strength and simultaneously higher flexibility. Furthermore, the matrix material may, for example, also serve to protect against moisture or the like.

Further embodiments of the present invention comprise a method for manufacturing a cushioning element for sports apparel from randomly arranged particles of an expanded material, which comprises positioning a functional element within a mold and loading the mold with the particles of the expanded material, wherein the loading takes place by way of at least two openings in the mold and/or wherein the loading takes place between different moveable parts of the mold.

The functional element may hereby be fixed within the cushioning element without requiring an adhesive bond between the cushioning element and the functional element, since there is a form closure between the functional element and the cushioning element. Alternatively, the functional element may also assume an adhesive bond with the cushioning element during the manufacture. For this, the functional element may, for example, be coated with an adhesive agent such as an adhesive prior to positioning within the mold.

In some embodiments, the particles of the expanded material are thereby treated with pressure and/or heat and/or steam within the mold.

An additional bond between the functional element and the cushioning element may also be established hereby. Through variation of the manufacturing parameters, the characteristics of such a bond may, for example, be further influenced.

In some embodiments, the at least two openings are positioned such that the loaded particles of the expanded material surround the functional element from at least two different sides.

As a result, the functional element is surrounded as evenly as possible from all sides by the particles of the expanded material and helps to avoid, to a large extent, flaws in the cushioning element. This is particularly advantageous for functional elements that have a flat design.

In certain embodiments, different aspects of the method for the positioning of a functional element within the cushioning element, just described, are combined with aspects of one of the methods, further described above, such as the method according to which a part of the wall of the mold is heated and combined, for example.

Hence, the characteristics of the cushioning element may be selectively influenced in different ways while using only one mold.

In other embodiments, the functional element itself comprises a cushioning element, which was manufactured by coating randomly arranged particles of an expanded material with a liquid matrix material, as described above.

In other embodiments, the functional element comprises a foil, in particular a foil that comprises thermoplastic urethane.

Such a foil may influence the characteristics of the cushioning elements in a number of different ways. For instance, the foil may serve as the optical design or further increase the stability of the cushioning element. The foil may, on the one hand, surround the cushioning element on the outside—for example for purposes of optical design—as well as be arranged within the cushioning element—for an increase in stability. Also, the foil may, for example, be arranged such that it allows air and/or liquids to pass in only one direction. Thus, the foil may be implemented as a membrane in the manufacture of breathable cushioning elements that simultaneously protect the wearer against moisture from the outside. Foils that comprise thermoplastic urethane are particularly advantageous for this, in particular in combination with particles from expanded thermoplastic urethane, since these may enter a chemical bond with such a foil, which is extremely resistant.

A foil may, for example, provide a closed surface structure to the cushioning element, which may help to increase the durability of the cushioning element or serve decorative purposes. The foil may also act as a "functional skin", which controls the movement and expansion of the expanded material of the cushioning element during use, e.g. during a gait if the cushioning element is used in a sole of a shoe. The foil may, e.g., be used to encompass the expanded material of the cushioning element in a certain region and thus limit the expansion and/or movement of the expanded material in that region. This may be desirable in regions where high stability is important.

On the other hand, a foil may also be used to create "free" regions, for example in the way further described below, in which the movement and expansion of the expanded material is possible to a larger degree, for example in regions where the high potential for energy return of the expanded material is to be beneficially employed, e.g. in the toe region of a shoe sole.

It is in particular possible that the functional element comprises a foil that is provided as a container, or a "bag", that contains randomly arranged particles of a second expanded material. The second expanded material may be the same as the expanded material of the cushioning element mentioned so far (which we will continue to simply call "the expanded material" in the following). It is, however, also possible, that the second expanded material is different from the expanded material.

Such a container allows positioning of the randomly arranged particles of the second expanded material in a large number of differently shaped regions in the cushioning element without the need for a specialized mold. It allows, in particular, positioning the randomly arranged particles of the second expanded material within the cushioning element in a simple manufacturing process.

A number of different options are possible. The foil providing the container may, e.g., be porous, perforated, comprise a mesh-like structure or be permeable to heat and/or steam in a different manner, so that the particles of the second expanded material may also be treated with pressure and/or heat and/or steam within the mold, preferably together with the particles of the expanded material of the cushioning element. Herein, potential openings in the foil and the container should be small enough that the particles of the second expanded material, and preferably also the particles of the expanded material, cannot pass these openings.

In such a process, the foil may disintegrate, allowing the randomly arranged particles of the expanded material and the randomly arranged particles of the second material to form a direct bond. The foil may, however, also remain within the cushioning element. It may thus act as a link between the particles of the expanded material and the particles of the second expanded material. In this case, it may also assume further functionality, e.g. act as a "functional skin" as described above.

It is, e.g., possible that the density of the randomly arranged particles of the second expanded material is higher than the density of the randomly arranged particles of the expanded material, and that the foil surrounding the particles of the second expanded material also limits a movement and expansion of the second expanded material in the cushioning element, thus providing a region of increased stability.

It is also possible that the density of the randomly arranged particles of the second expanded material is lower than the density of the randomly arranged particles of the expanded material. Hence a region may be created within the cushioning elements, provided in essentially any desired shape and/or position within the cushioning element, in which the particles of the second expanded material are "freed up", allowing a more pronounced movement and expansion of these particles and a high energy return to the user, e.g. during push-off during a gait.

Moreover, explicit reference is made to the fact that such a foil, in particular a foil provided as a container containing randomly arranged particles of a second expanded material may also be used with any other method, embodiment or aspect of the invention described herein or conceivable to the skilled person, even if not explicitly described. For example, such a foil container with particles of the second expanded material could also be positioned within a mold into which the particles of the expanded material are loaded within a stream of steam/transport liquid.

In some embodiments, the functional element is free of particles of the expanded material.

Since the functional element may be fixed in the cushioning element without the use of an adhesive bond by using the manufacturing method described, the use of a large number of materials for the design of such a functional element is permitted. In particular, the materials used do not have to be glueable with the expanded material of the cushioning element, which significantly increases the constructive freedom.

In accordance with further embodiments of the invention, the particles of the expanded material and/or the particles of the second expanded material, which are used in a method described herein, comprise a mixture of at least two kinds of particles, which differ in their raw material and/or their size and/or their density and/or their color.

In accordance with various embodiments of the invention, the particles of the expanded material and/or the particles of the second expanded material, which are used in a method described herein, comprise one or more of the following materials: expanded ethylene vinyl acetate, expanded thermoplastic urethane, expanded polypropylene, expanded polyamide, expanded polyether block amide, expanded polyoxymethylene, expanded polystyrene, expanded polyethylene, expanded polyoxyethylene, and expanded ethylene propylene diene monomer.

The characteristics of the cushioning element may be influenced in various ways, depending on the requirement profile of the cushioning element, through a suitable combination of different kinds of particles of an expanded material, which differ in their material, their size, their color, their density etc. In combination with one or more of the manufacturing methods listed here, a large number of variation possibilities and options for exerting influence for the manufacture of cushioning elements are possible.

In certain embodiments of the invention at hand, the cushioning element is provided as a shoe sole or part of a shoe sole.

Individual aspects of the mentioned embodiments and aspects of the invention may hereby, depending on the requirement profile of the sole and the shoe, be combined with one another in an advantageous manner. Furthermore, it is possible to exclude individual aspects, should these not be of importance for the respective intended purpose of the shoe.

Cushioning elements manufactured by embodiments of manufacturing methods according to the invention as described herein or otherwise conceivable constitute further aspects of the present invention. Moreover, sports apparel, in particular sports shoes, comprising such cushioning elements according to the invention (e.g. provided as a shoe sole or part thereof) form also part of the present invention.

According to further embodiments of the present invention, the individual method steps of one or more of the methods described herein are performed in an automatic production facility at least at two stations.

As a result of the fact that the described manufacturing methods increase the possibilities of exerting influence on the cushioning element during the manufacture and simultaneously reduce the number of required molds and/or manufacturing steps, the methods described herein are particularly suited for an automated manufacture of cushioning elements.

In some embodiments, the automated production facility has at least two of the following stations: a station for the placement of a functional element in the mold, a loading station for loading the mold with particles of the expanded material, a steam station, a heat treatment station, a cooling station, a stabilization station and a removal station.

In further embodiments, the mold is moved from one station to the next station of the automated production facility for receiving the particles of the expanded material. This onward movement may take place both manually as well as under the control of a computer and/or automated.

Since, as described earlier, the manufacturing methods described herein permit the selective exertion of influence on the characteristics of the cushioning element within the mold, it is not necessary to remove the cushioning element from the mold and to place it into a new mold between the individual stations, which significantly reduces the manufacturing effort and permits the manufacture along an automated production facility.

In some embodiments, the production facility selects from a plurality of molds, in a computer controlled manner, the mold for the reception of the particles of the expanded material.

This makes it possible to customize cushioning elements individually in accordance with the wishes and needs of a customer, or rather allowing said customer to choose from a plethora of possible designs themselves.

BRIEF DESCRIPTION OF THE DRAWINGS

In the following detailed description, embodiments of the invention are described referring to the following figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention are described in the following detailed description mainly with regard to methods for the manufacture of soles for sports shoes. However, emphasis is made with regard to the fact that the present invention is not limited to these embodiments. For example, the present invention may also be applied to methods for the manufacture of cushioning elements for winter sports apparel, running apparel, outdoor apparel, football apparel, golf apparel, combat sports apparel or the like.

Figure 1:
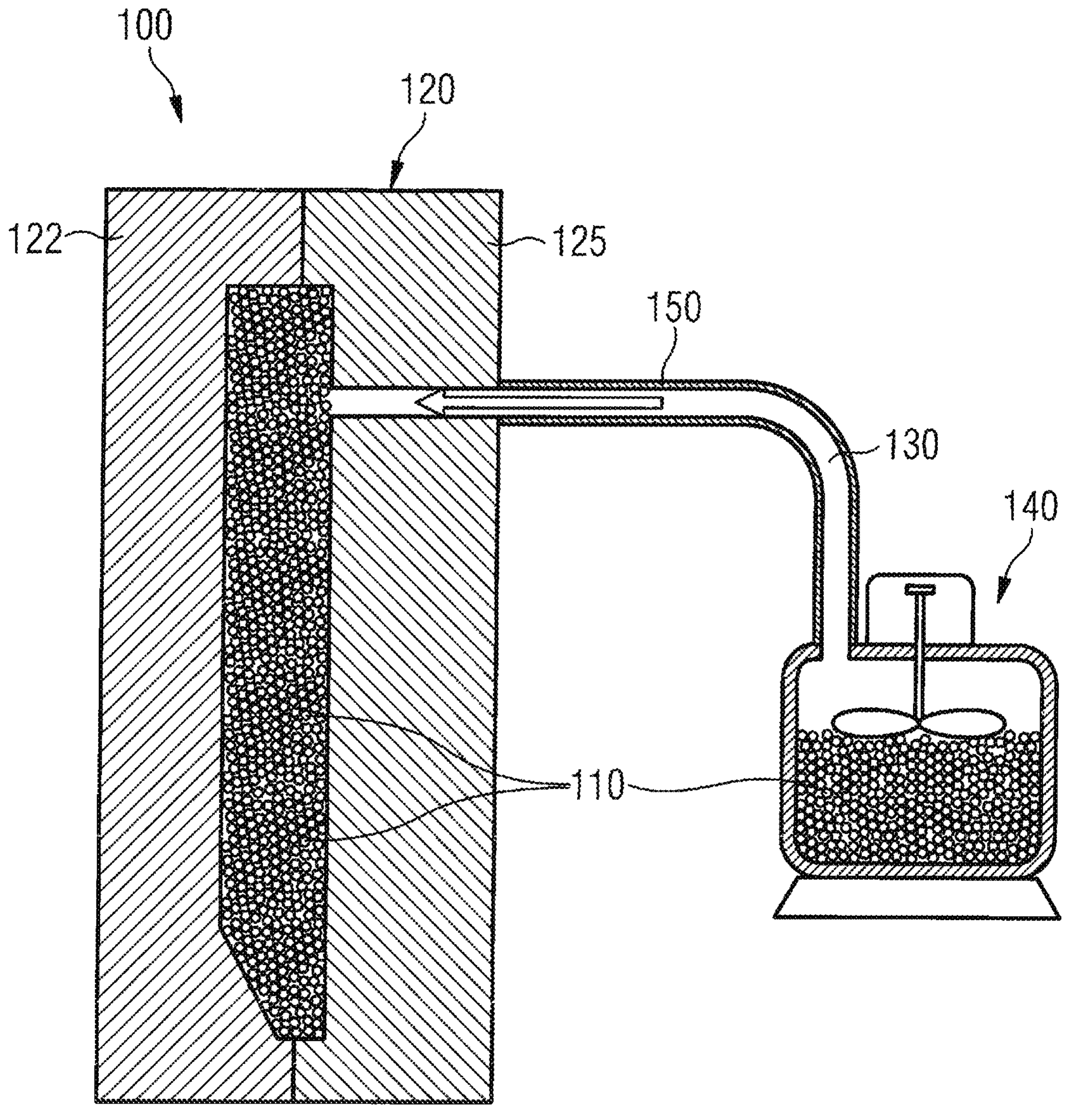
FIG. 1 is a schematic illustration of a method for the manufacture of a cushioning element, whereby particles of an expanded material are loaded into a mold by means of a stream of a transport liquid and/or a stream of steam, according to certain embodiments of the present invention.

FIG. 1 schematically shows a method 100 for the manufacture of a cushioning element. The method 100 comprises the loading of a mold 120, which in the embodiments shown includes a first part 122 and a second part 125, with randomly arranged particles 110 of an expanded material. The particles 110 are hereby loaded into the mold 120 through a stream of a transport liquid and/or stream of steam 130.

The stream of liquid and/or steam 130 is used in order to facilitate the transport into the mold. In certain embodiments, the transport liquid is water. In other embodiments, a powder that behaves like a liquid is used as the transport liquid, which prevents the particles 110 of the expanded material from sticking to one another and/or interlocking. An example of such a powder is Luwax® OP Powder, obtainable from the BASF. Other materials that have similar characteristics are just as suitable.

For this, the particles 110 may first of all, for example, be mixed with the transport liquid or the steam in a collecting basin 140 and then be pumped and/or blown into the mold 120 through an inlet pipe 150. While FIG. 1 merely shows a single inlet pipe 150 and a single inlet, express reference is to be made here to the fact that the present invention also comprises embodiments, in which the particles 110 are loaded into the mold 120 through more than one inlet pipe 150 and/or through more than one inlet.

In some embodiments, the particles 110 in the stream of liquid and/or steam 130 are loaded into the mold 120 under pressure, which makes it possible to compress the particles of the expanded material to a certain extent already during the loading of the mold 120, in order to achieve a higher density of the material of the cushioning element. The density of the material of the manufactured cushioning element is thereby dependent, among other things, on the pressure with which the particles in the stream of liquid and/or steam 130 are loaded into the mold 120.

In further embodiments of method 100, the transport liquid and/or the steam may be at least partially, or even entirely, removed out of the mold 120 after the introduction of the desired quantity of particles 110 of the expanded material. For example, for this the mold 120 has a series of openings (not shown), through which the transport liquid and/or the steam may be removed after introduction of the particles 110. For example, the openings are connected to a vacuum system (also not shown), which extracts the transport liquid and/or steam from the mold 120 through suction.

The use of randomly arranged particles 110 of an expanded material, which are loaded into a mold 120 with the aid of a stream of liquid and/or steam 130, significantly facilitates the manufacture of such a cushioning element. In particular, it is guaranteed by means of the stream of liquid and/or steam 130 that the randomly arranged particles 110 fill the mold 120 as evenly as possible, which reduces the risk of flaws forming in the material of the cushioning element. It may be beneficial that such a method is used with an additional functional element (not shown), which is positioned in said mold 120 prior to loading. The stream of liquid and/or steam 130 thereby circulates around the element from all sides and thus transports the particles 110 to several sides of the functional element, so that the risk of flaws forming in the cushioning element may be reduced.

The use of randomly arranged particles 110 of an expanded material in combination with a stream of liquid and/or steam 130 may be beneficial, since the particles 110 do not require any special arrangement and may be easily transported in such a liquid and/or steam flow 130 due to their low density.

In further embodiments, after loading the mold 120, the particles 110 are exposed to a pressure and/or heat and/or steam treatment. In certain embodiments, after loading of the mold 120 and prior to the pressure and/or heat and/or steam treatment, the inlet pipe(s) 150, or rather the inlet opening(s) of the mold 120, are closed. By means of the pressure and/or heat and/or steam treatment, the particles 110 of the expanded material may combine by slightly melting their surfaces. In certain embodiments, the particles 110 undergo chemical bonding by means of the pressure and/or heat and/or steam treatment. Such a bond is particularly permanent and resistant and makes it possible to eliminate the use of additional composite materials such as adhesives. The precise characteristics of the bond created between the particles depend on the exact parameters—for example pressure, temperature, duration, and treatment, etc.—of the pressure and/or heat and/or steam treatment.

In additional embodiments of the method, the transport liquid is only partially removed out of the mold 120 or not at all. The remaining liquid solidifies in the mold 120 spontaneously or under the influence of the above mentioned pressure and/or heat and/or steam treatment. The transport liquid may thus assume further functions in the manufacture of cushioning elements for sports apparel, which further reduces the material and manufacture expenses. For example, the solidified transport liquid may further increase the tear strength of the cushioning element.

In further embodiments, the transport liquid and/or the solidified liquid may further at least partially be dissolved out and/or melted out and/or removed by pressure or by other means from the cushioning element after conclusion of the pressure and/or heat and/or steam treatment.

Through the combination of the various aspects of the manufacturing method according to the invention described herein, the method and the characteristics of the thus manufactured cushioning element may be influenced in many ways.

Figure 2:
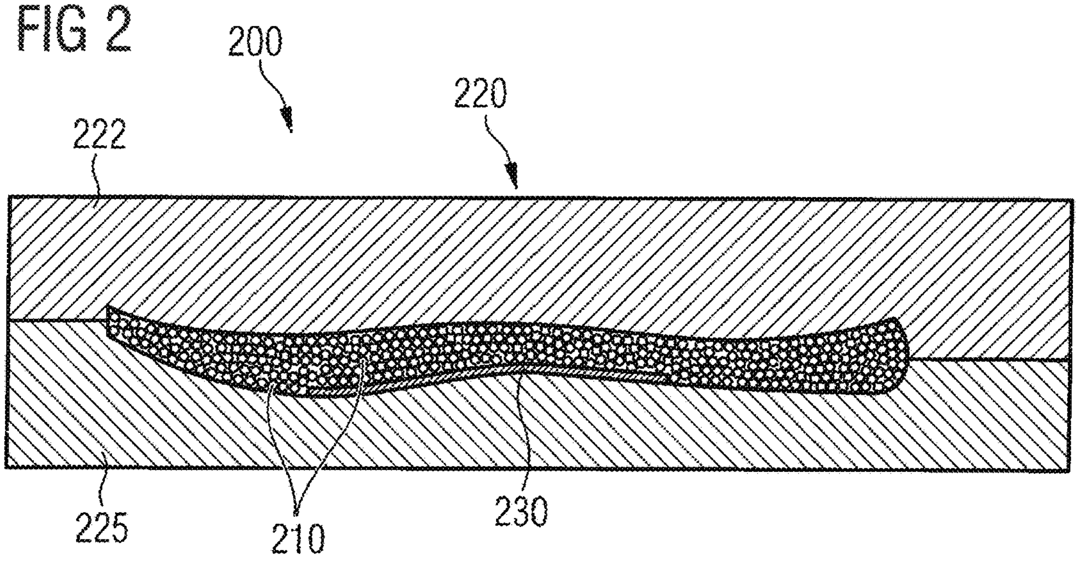
FIG. 2 is a schematic illustration a method for manufacturing a cushioning element, whereby a part of the wall of a mold is heated to a temperature which at least partially melts the particles of the expanded material that border this part of the wall, according to certain embodiments of the present invention.

A further method 200 for the manufacture of cushioning elements for sports apparel in accordance with embodiments of the present invention is outlined in FIG. 2, which comprises loading a mold 220 with randomly arranged particles 210 of an expanded material. As described above with respect to embodiment 100, the mold 220 comprises a first part 222 and a second part 225, which allows a simple removal of the cushioning element out of the mold 220 after conclusion of the manufacturing process described by means of opening both parts 222 and 225 relative to one another. However, express reference is made to the fact that the arrangement of the mold 220 shown here only serves as an example. The method 200 may be applied likewise to molds otherwise arranged that only have a single partition or more than two parts. The same applies for the manufacturing method outlined in FIG. 1.

The method 200 further comprises heating a part 230 of the wall of the mold 220, which is made of metal in the preferred embodiments of the method belonging to the invention, to a temperature that will cause the particles of the expanded material adjacent to the wall in this part 230 to melt either partially or entirely. The part 230 of the wall of the mold 220 may be heated by an electrical current that runs through this part 230. For example, one or more conductor spirals may be located in this part 230 of the wall, through which an electrical current flows that heats the wall of the mold 220. In other embodiments, the current flow is brought about through electromagnetic induction. In certain embodiments, the current flow may be selectively switched on and off independently from one another in individual parts 230 of the wall of the mold 220, so that different areas of the cushioning element may be influenced with a single mold 220. Other approaches regarding temperature control, for example by way of cavities (not shown) in the mold 220, through which hot water/steam or other means flow to increase the temperature and/or also for the subsequent cooling are also conceivable.

In addition, the randomly arranged particles 210, as already described above, may be exposed to a pressure and/or heat and/or steam treatment within the mold 220.

In accordance with further embodiments of the invention, at least the part 230 of the wall of the mold 220, which is heated, has a structured surface. The structure may, for example, be honeycomb shaped, wave shaped, grid shaped, rib shaped, zigzag shaped or designed in any other manner. Through a suitable selection of the structure of the heated part 230 of the wall of the mold 220, the characteristics of the corresponding part of the surface of the cushioning element may thus be influenced as desired. Thus, for example, the method 200 described herein may be used to impress a structure upon a cushioning element designed as a shoe sole, which may for example increase the slip resistance of the sole on the ground. Such a structure may, for example, also serve more as optical design and decoration by means of structures or the like.

In further embodiments of the described method 200, the at least partially melted particles are further so constituted after cooling down that they selectively stiffen the cushioning element. As a result of the partial melting of the particles that are located in the area of the heated part 230 of the wall of the mold 220, and subsequent cooling thereof, the strength of these particles increases in comparison with particles which were not at least partially melted by the heat that emanates from the part 230 of the wall of the mold 220. This leads to an increase in the stiffness of the cushioning element in this area. Particularly in combination with a part 230 of the wall of the mold 220 that is intended to be heated and designed with a structure as described above, the behavior of the cushioning element, in particular its stiffness, may thus be selectively influenced in individual areas.

Figure 3:
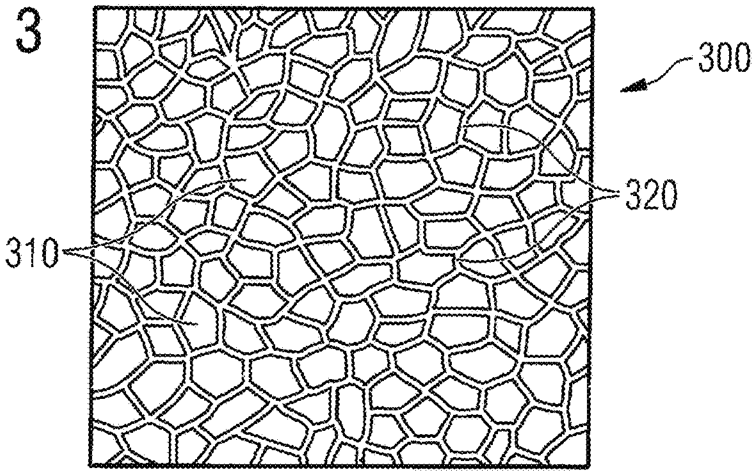
FIG. 3 is a top view of a cushioning element manufactured according to the method shown in FIG. 2, which has a honeycomb shaped surface.
Figure 4:
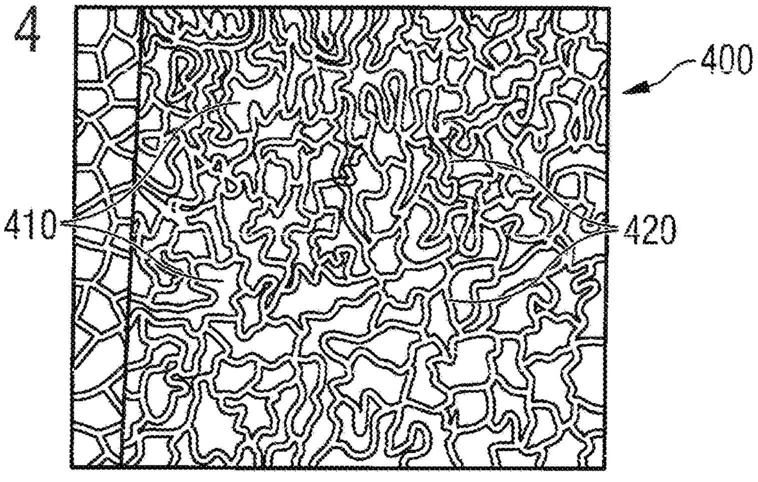
FIG. 4 is a top view of a cushioning element manufactured according to the method shown in FIG. 2, which has a surface with irregular protrusions and depressions.

FIGS. 3 and 4 show design examples of surfaces of cushioning elements 300 and 400 manufactured in accordance with method 200 described herein. The cushioning element 300 has a honeycomb shaped surface comprising individual honeycombs 310 and thinner channels 320 that lie there between. The honeycombs 310 permit, for example, a larger supporting surface of the cushioning element 300, if it is designed as a shoe sole for instance. The channels 320 may thus, for example, take up liquid that is displaced upon treading, which positively influences the slip resistance of such a sole.

On the other hand, the cushioning element 400 has a surface that comprises irregular protrusions 410 and depressions 420.

In comparison to cushioning element 300, this means a smaller supporting surface of the surface of the cushioning element, but simultaneously also an improved capacity in the occurrence of displaced liquid, for example.

Furthermore, the different design of the surfaces of the cushioning elements 300 and 400 influences the stiffness of the cushioning element in different ways.

In summary, the surface structures of a cushioning element as well as its stiffness may be influenced in many different ways through the method 200 described herein and the suitable selection of the structure of the part 230 of the wall of the mold 220 to be heated.

Further embodiments of the present invention comprise a method for manufacturing a cushioning element for sports apparel, in which a mold is loaded with randomly arranged particles of an expanded material, wherein the particles are further coated with a liquid matrix material in order to achieve a substantially even distribution of the particles in the matrix material. For example, liquid polyurethane—Liquid PU—or materials with comparable characteristics come into question as liquid matrix material.

Through the use of the matrix material, the probability that the characteristics of the cushioning element are substantially constant rises and in particular reduces the risk that flaws occur in the material.

In certain embodiments, the particles of the expanded material and/or the matrix material are further treated with pressure and/or heat and/or steam. The matrix liquid may, for example, solidify and enter a bond with the particles of the expanded material. These may further, as already described above, enter a bond among themselves, for instance through melting or preferably through a chemical reaction. Thus, the matrix liquid may adopt a double function: on the one hand, it facilitates a material distribution that is as equal as possible within the mold and, on the other hand, it may additionally influence the characteristics of the cushioning element. Thus, the solidified matrix liquid may, for example, increase the tear strength of the cushioning element and/or it may be used for the manufacture of very thin and light weight cushioning elements. Depending on the relationship between the amount of matrix material and the amount of particles of the expanded material, and dependent on the materials used, different design possibilities result for a cushioning element.

Figure 5:
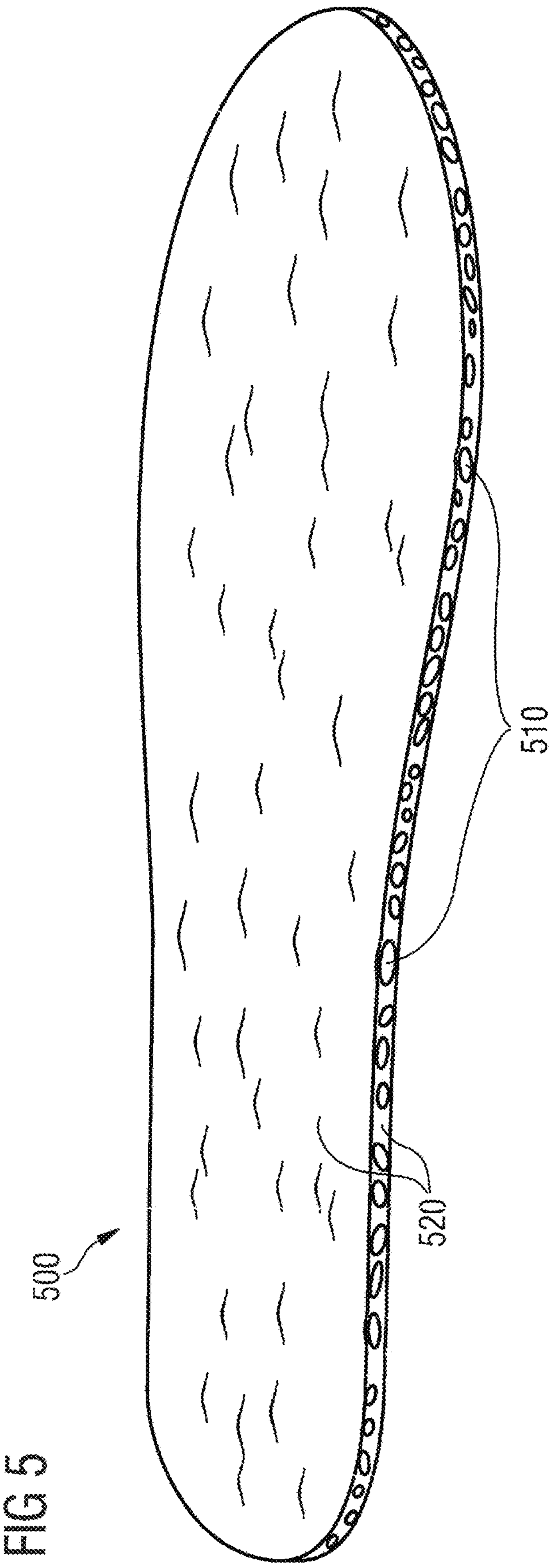
FIG. 5 is a perspective view of a cushioning element that is manufactured using a method in which randomly arranged particles of an expanded material are coated with a liquid matrix material, which preferable solidifies under the influence of a pressure and/or heat and/or steam treatment, according to certain embodiments of the present invention.

FIG. 5 shows embodiments of a cushioning element designed as a midsole by means of the method described herein, which has randomly arranged particles 510 that are substantially equally arranged in a solidified matrix material 520. The thus manufactured midsole 500 has a very minimal thickness and a very low weight with great tear strength and deformation ability. Liquid PU was used as the matrix material in the embodiment shown in FIG. 5.

Figure 6:
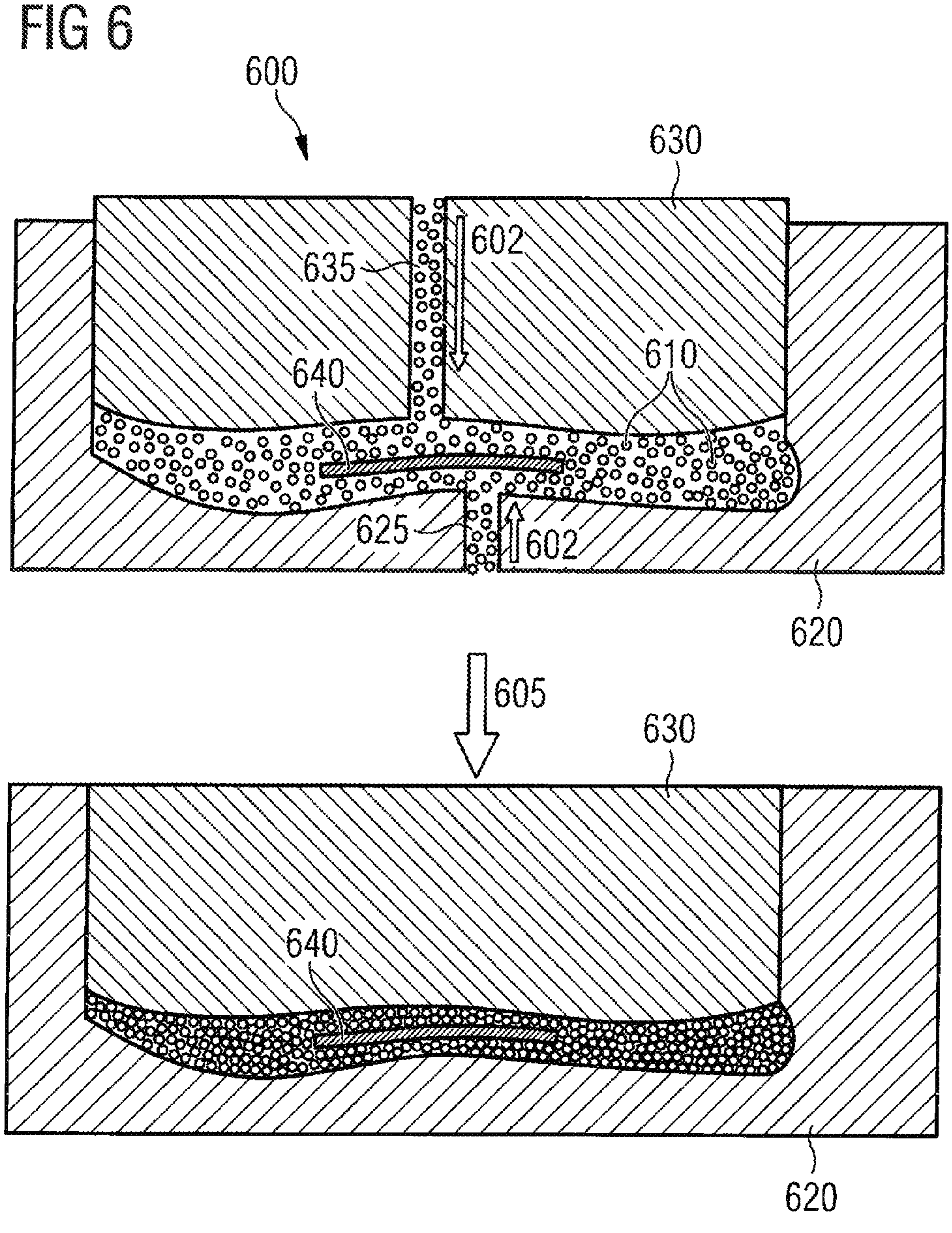
FIG. 6 is a schematic illustration of a method for manufacturing a cushioning element, which comprises the positioning of a functional element in a mold and the loading of the mold with randomly arranged particles of an expanded material through two openings in the mold, according to certain embodiments of the present invention.

A further method 600 for the manufacture of a cushioning element in accordance with embodiments of the present invention is outlined in FIG. 6. The method comprises the positioning of a functional element 640 within the mold, which in the example shown in FIG. 6 comprises a negative 620 and a stamp 630 that may be moved against each other. However, like the embodiments of the methods belonging to the invention described above, the design of the mold shown in FIG. 6 is only to be considered as an example. For example, the functional element 640 may be fixed on a needle and with it positioned within the mold 620, 630.

Express reference is to be made at this point to the fact that all the methods described herein may be performed for the manufacture of a cushioning element without the inclusion of an additional functional element, etc. and that such embodiments also represent aspects of the present invention. The methods described here in detail merely serve as illustrations, in order to provide the person skilled in the art with an overview of the possible areas of application and embodiments.

Furthermore, the method 600 comprises a step of loading 602 the mold with randomly arranged particles 610 of an expanded material through at least two openings 625, 635 in the mold, as outlined in the upper part of FIG. 6. The at least two openings 625, 635 may be closed after conclusion of the step of loading 602 of the mold.

In certain embodiments, the at least two openings 625, 635 are positioned such that the loaded particles 610 of the expanded material surround the functional element 640 from at least two different sides, which provides a substantially even distribution of the particles 610 around the functional element 640 and thus reduces the risk of faults forming in the material of the cushioning element. Depending on the shape and size of the functional element 640, it may be beneficial to use more than two openings for loading the mold and/or to vary the positions of the openings such that a distribution of the particles 610 that is as even as possible within the mold is provided, in particular with functional elements 640 that have a flat design.

Optionally, the method 600 further comprises the step of compressing 605 the particles 610 loaded into the mold by moving the stamp 630 in the direction of the negative 620. The result of such a step is outlined in the bottom part of FIG. 6. The compressing 605 increases the density of the particles 610 of the expanded material and thus also the density of the cushioning element manufactured using the method described. Furthermore, this step may reduce the thickness of the cushioning element.

Moreover, the method 600 described herein may comprise the treatment of the particles 610 within the mold with pressure and/or steam and/or heat, as already described above in relation to manufacturing methods according to other aspects of the present invention.

In certain embodiments of the method 600 just described, the mold 620, 630 additionally permits parts of the wall of the mold 620, 630 to be selectively heated to a temperature that will at least partially melt the particles of the expanded material adjacent to part of the wall, as described above.

In further embodiments, the functional element on its part comprises a cushioning element, which was manufactured by coating particles of an expanded material within a mold with a liquid matrix material, as described herein.

Again, reference is made generally to the fact that the individual aspects of the manufacturing methods described herein may be combined with one another, in as far as possible, and that such combined methods expressly belong to the subject matter of the present invention. Reference ought to be made once more to the fact that individual steps of the methods described may be omitted, in as far as these are not necessary for the manufacture of a cushioning element with the desired functionality. Such modified methods also represent aspects of the present invention. Moreover, cushioning elements manufactured by embodiments of an inventive method and sports apparel comprising such a cushioning element form also part of the present invention.

Figure 7:
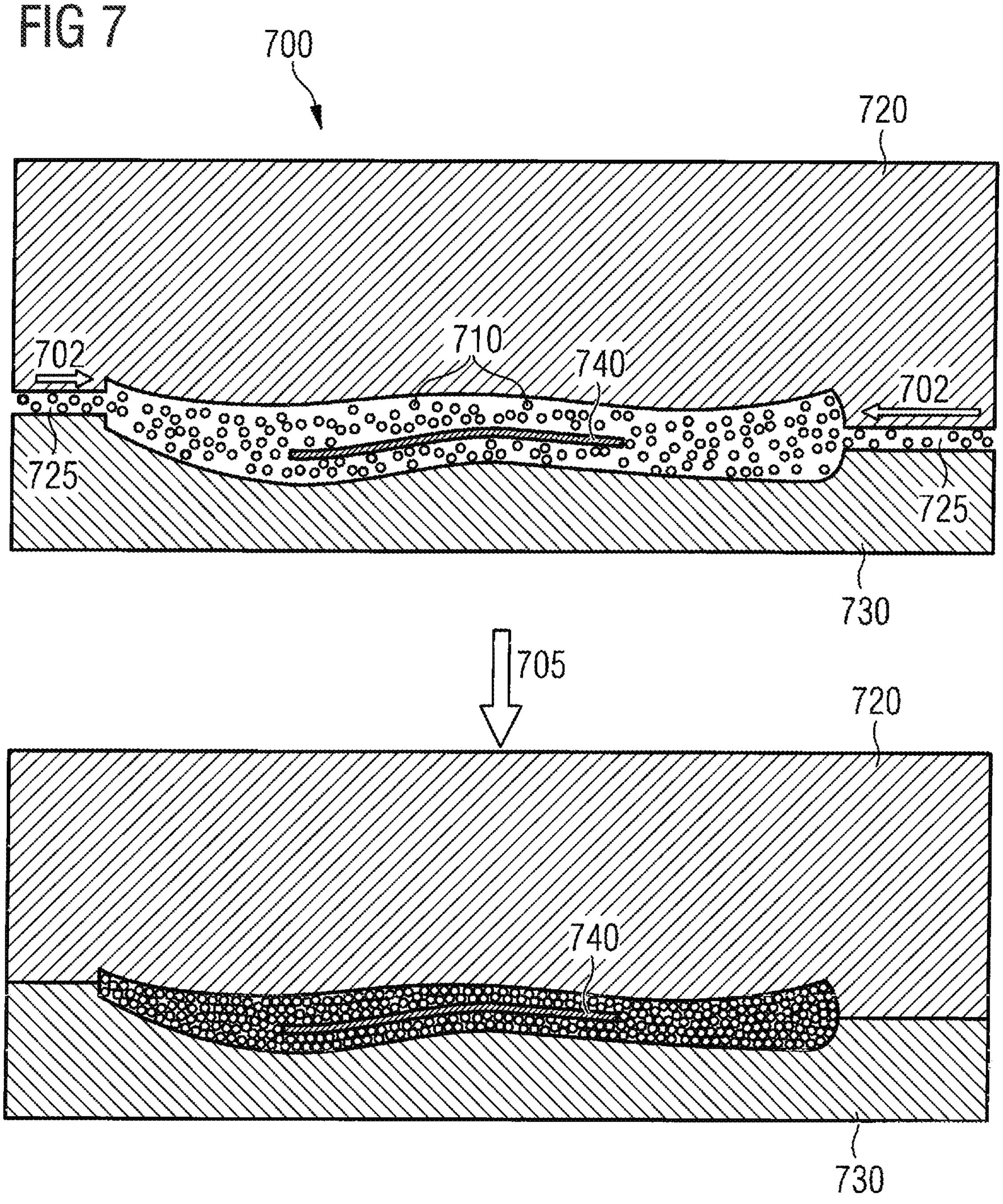
FIG. 7 is a schematic illustration of a method for manufacturing a cushioning element, which comprises the positioning of a functional element in a mold and the loading of the mold with randomly arranged particles of an expanded material through two openings between moveable parts of the mold, according to certain embodiments of the present invention.

FIG. 7 shows a further variation 700 of the just described method for the manufacture of a cushioning element, which represents further embodiments of the present invention. In contrast to method 600, in the method 700, the step of loading 702 the mold with the randomly arranged particles 710 of an expanded material, after the positioning of a functional element 740 within the mold, takes place through at least two openings 725 between different moveable parts 720, 730 of the mold, as outline in the top part of FIG. 7. In the method described herein, the mold is closed, after the step of loading 702 the mold, by moving 705 the parts 720, 730 of the mold towards one another. The randomly arranged particles 710 situated in the mold are hereby further compressed if necessary, depending on how far the two parts 720, 730 of the mold are moved towards one another. The result of this step is outlined in the bottom part of FIG. 7.

Also, the at least two openings 725 may be arranged such that the particles 710 surround the functional element 740 from at least two sides, in order to achieve a distribution of the particles 710 within the mold that is as even as possible and to avoid the occurrence of flaws in the cushioning element as much as possible.

Figure 10:
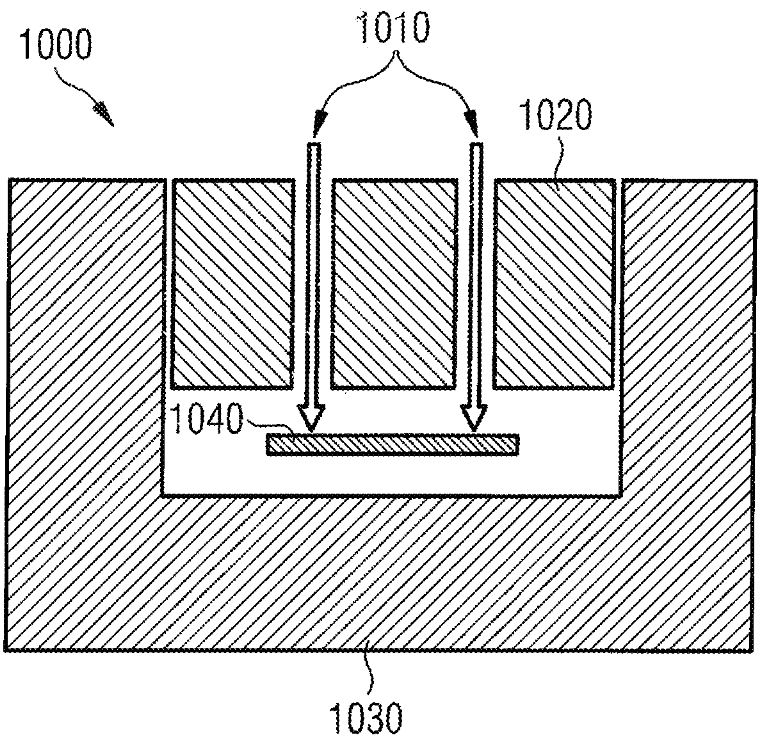
FIG. 10 is a schematic illustration of a method for manufacturing a cushioning element, which comprises the positioning of a functional element in a mold and the loading of the mold with randomly arranged particles of an expanded material through two openings in the mold, which comprises a moveable stamp and a negative, according to certain embodiments of the present invention.
Figure 11:
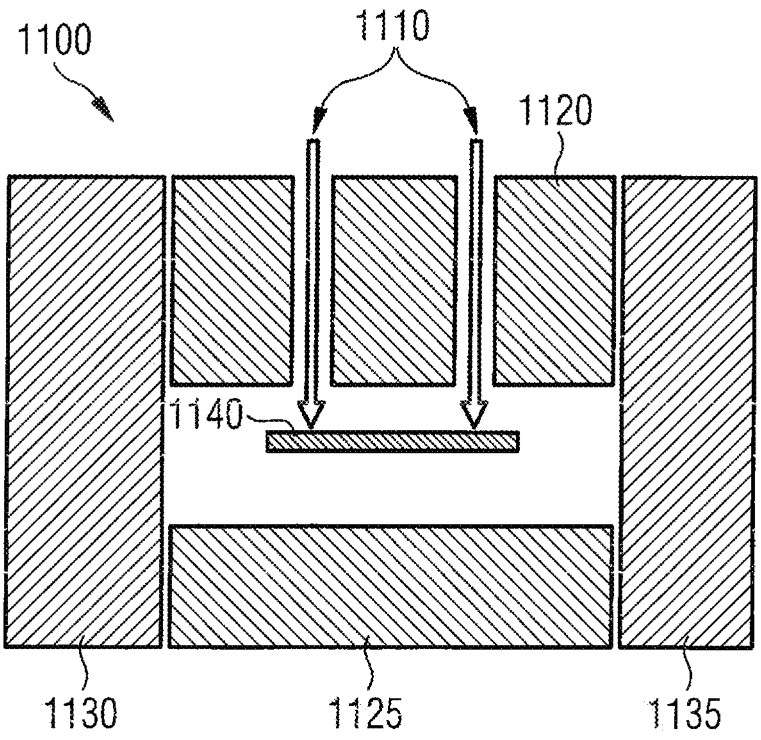
FIG. 11 is a schematic illustration of a method for manufacturing a cushioning element, which comprises the positioning of a functional element in a mold and the loading of the mold with randomly arranged particles of an expanded material, whereby the mold has several moveable stamps, according to certain embodiments of the present invention.

FIGS. 10 and 11 show further embodiments 1000, 1100 of methods for the manufacture of a cushioning element.

In the method 1000, outlined in FIG. 10, to begin with in an optional step, a functional element 1040 is positioned in a mold. The mold shown in FIG. 10 comprises a moveable stamp 1020 and a negative 1030. In a further step, the mold is loaded with particles of an expanded material 1010 through two or more openings at different positions in the movable stamp 1020. After loading, the openings through which the loading 1010 occurred, are preferably closed. In a further optional step, the stamp 1020 may further be moved toward the negative 1030 and the mold closed even more thusly, which leads to a compression of the particles of the expanded material situated in the mold. Afterwards, the particles of the expanded material may, for example, be exposed to a further pressure/steam/heat treatment, a part of the wall of the mold may be heated, and so on.

In the method 1100, outlined in FIG. 11, in an optional step a functional element 1140 is also positioned in a mold. However, the mold in the example shown in FIG. 11 comprises two (or even more) moveable stamps 1120, 1125, which may move relative to one another. The mold further comprises one or more stationary parts 1130 and 1135. Here the mold may also, for example, be loaded 1110 with particles of an expanded material through openings in the movable stamps 1120, 1125. However, in further embodiments of the method, it is also possible to first of all move the lower stamp 1125 further out of the mold and to then load the particles into the mold from above. As a result, a functional element 1140, which is to be positioned close to the underside of the sole to be manufactured, is first of all sufficiently surrounded by particles without the mold having to be converted so that it may also be loaded with particles from below. As soon as the mold is loaded in this manner, the lower stamp 1125 may be moved further up, i.e. into the mold, until it is has assumed its final position relative to the functional element 1140. In certain embodiments, the excess particles of the expanded material, which may be situated between the lower stamp and the functional element 1140 due to loading with a further opened lower stamp 1125, are now forced to the side and/or upwards. Subsequently, the mold may be further loaded and/or closed and the cushioning element may be manufactured as already described a number of times. Thus, the method outlined in FIG. 11 and discussed herein permits the manufacture of cushioning elements in combination with a large number of differently designed functional elements, without the need for a conversion of the machine used for manufacture.

In certain embodiments of the above described methods 600, 700, 1000, 1100, the functional element 640, 740, 1040, 1140 comprises a foil, which may further comprise thermoplastic urethane. A functional element 640, 740, 1040, 1140 provided as such a foil may in particular be used to influence the surface characteristics and dimensional stability of the cushioning element.

For this, the foil may, on the one hand, surround the cushioning element on the outside—for example for optical design—as well as be arranged within the cushioning element—for an increase of the stability. As already described in connection with other functional elements 640, 740, 1040, 1140 above, the foil may be inserted in a mold. Alternatively, the foil may also be inserted in a mold such that it lies flat against the surface of the mold. For example, the foil may have been deep-drawn prior to the insertion into the mold. In this case, the particles are poured into a kind of foil-shell, so that the foil surrounds the cushioning element in the finished cushioning element.

Furthermore, it is possible to combine both variants, i.e. to use a foil as a cover of the cushioning element as well as a functional element within the cushioning element.

In particular, a foil may provide a closed surface structure to the cushioning element, which help to increase the durability of the cushioning element or serve decorative purposes. The foil may also act as a "functional skin", which controls the movement and expansion of the expanded material of the cushioning element during use, e.g. during a gait if the cushioning element is used in a sole of a shoe. The foil may also be a breathable membrane that is waterproof and prevents an ingress of water into a shoe or garment comprising a cushioning element with such a foil.

The foil may be used to encompass the expanded material of the cushioning element in a certain region and thus limit the expansion and/or movement of the expanded material in that region. This may be desirable in regions where high stability is important.

On the other hand, a foil may also be used to create "free" regions, as described in more detail shortly, in which the movement and expansion of the expanded material is possible to a larger degree, for example in regions where the high potential for energy return of the expanded material is to be beneficially employed, e.g. in the toe region of a shoe sole.

Figure 12:
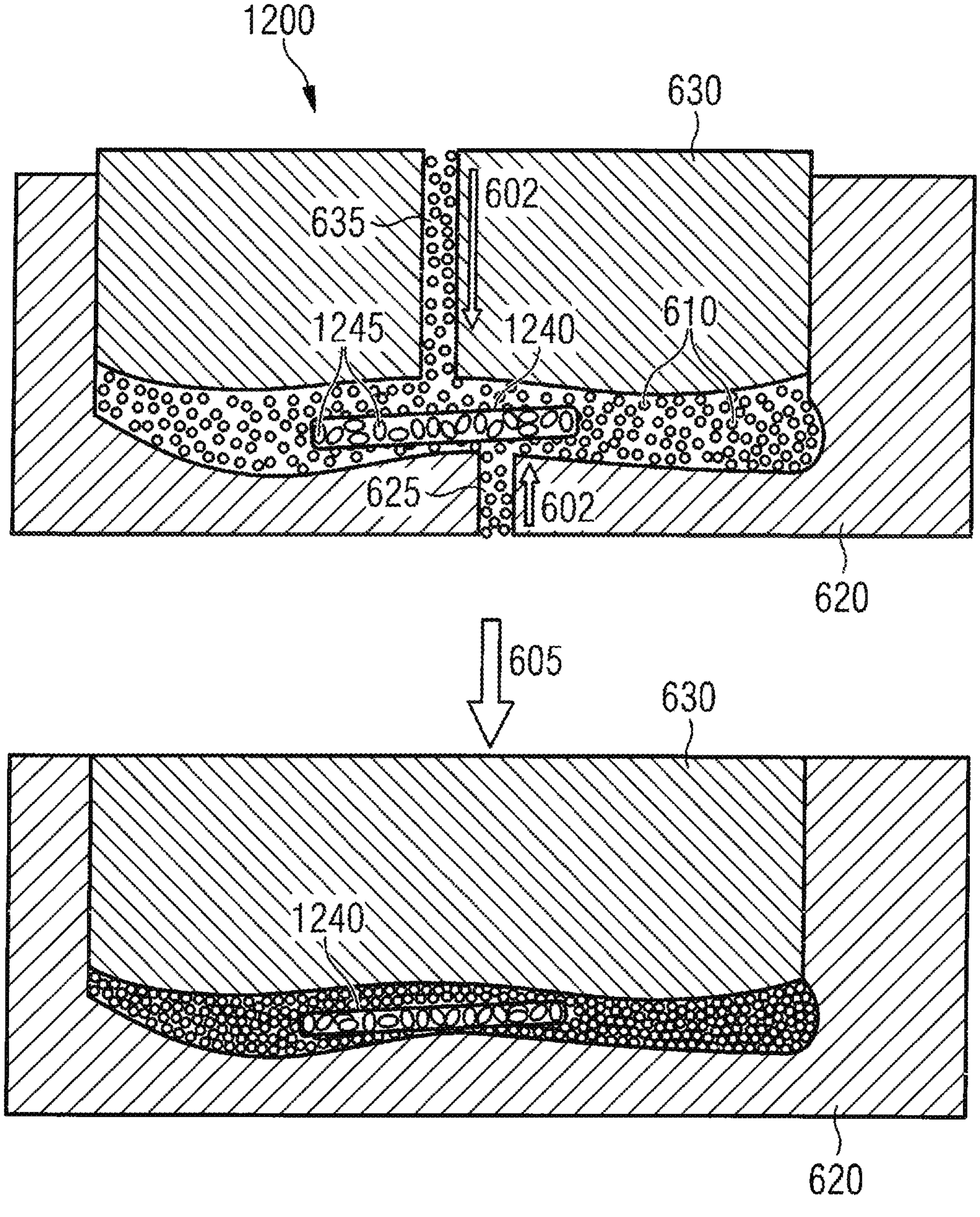
FIG. 12 is a schematic illustration of additional embodiments of the method shown in FIG. 6, wherein the functional element comprises a foil that is provided as a container that contains randomly arranged particles of a second expanded material.

FIG. 12 shows a variation 1200 of embodiments of an inventive method 600 shown in FIG. 6. All explanations and considerations put forth in relation to FIG. 6 apply equally to the embodiment 1200 shown in FIG. 12.

As discussed above, it is possible that the functional element 640 of FIG. 6 comprises a foil 1240. It is furthermore possible that the foil 1240 is provided as a container 1240, or a "bag", that contains randomly arranged particles 1245 of a second expanded material, as shown in FIG. 12.

It is explicitly mentioned here that any of the functional elements 640, 740, 1040, 1140 mentioned herein may comprise such a foil 1240, in particular a foil 1240 provided as a container 1240 that contains randomly arranged particles 1245 of a second expanded material. Moreover, such a container may be used with any embodiment or aspect of the invention described herein or conceivable to the skilled person, even if not explicitly described.

The second expanded material may be the same as the expanded material of the cushioning element mentioned so far (which we will continue to simply call "the expanded material" in the following). It is, however, also possible, that the second expanded material is different from the expanded material. Possible materials for the particles 1245 of the second expanded material include the materials mentioned already in relation to the particles 110, 210, 510, 610, 710, 1010 and 1110 of the expanded material.

Such a container 1240 allows positioning of the randomly arranged particles 1245 of the second expanded material in a large number of differently shaped regions in the cushioning element without requiring a specialized mold 620, 630. The container 1240 may, e.g., be preshaped and this preshape controls the positioning and shape of the region comprising the particles 1245 within the cushioning element. It allows, in particular, positioning the randomly arranged particles 1245 of the second expanded material within the cushioning element in a simple manufacturing process. It also allows for providing inlets or inserts in the forefoot region or the heel region of a sole, for example inlets/inserts that provide particularly beneficial energy return, cushioning, stabilization or the like to a foot of a wearer of a shoe.

The foil 1240 providing the container 1240 may be porous, perforated, comprise a mesh-like structure or be permeable to heat and/or steam in a different manner, so that the particles 1245 of the second expanded material may also be treated with pressure and/or heat and/or steam within the mold 620, 630, and may be treated together with the particles 610 of the expanded material of the cushioning element. Herein, potential openings in the foil 1240 and the container 1240 should be small enough that the particles 1245 of the second expanded material, and preferably also the particles 610 of the expanded material, cannot pass through these openings.

In such a process, the foil 1240 may disintegrate, allowing the randomly arranged particles 610 of the expanded material and the randomly arranged particles 1245 of the second material to form a direct bond. In contrast, the disintegrated foil 1240 may act as a bonding agent. The foil 1240 may, however, also remain within the cushioning element. It may thus act as a link between the particles 610 of the expanded material and the particles 1245 of the second expanded material. In this case, it may also assume further functionality, e.g. act as a "functional skin" as described above.

It is possible that the density of the randomly arranged particles 1245 of the second expanded material is higher than the density of the randomly arranged particles 610 of the expanded material, and that the foil 1240 surrounding the particles 1245 of the second expanded material also limits a movement and expansion of the second expanded material in the cushioning element, thus providing a region of increased stability. The particles 1245 may be pressed under pressure into the container 1240 before being inserted into the mold 620, 630 to achieve the higher density.

It is also possible that the density of the randomly arranged particles 1245 of the second expanded material is lower than the density of the randomly arranged particles 610 of the expanded material. The particles 1245 may loosely arranged in the container 1240 which is inserted into the mold 620, 630 to achieve the lower density. Hence, a region may be created within the cushioning elements, provided in essentially any desired shape and/or position within the cushioning element, in which the particles 1245 of the second expanded material are "freed up", allowing a more pronounced movement and expansion of these particles 1245 and a high energy return to the user, e.g. during push-off during a gait.

In other embodiments, the functional element 640, 740 is free of particles of the expanded material, so that the functional element in particular does not enter a chemical bond with the particles of the expanded material. This, for example, may be beneficial for functional elements, for which the possibility of removing them from the cushioning element at a later time or to replace it, such as electronic elements for instance that comprise a power supply, is to exist. Further examples of such functional elements may include a reinforcing element or an outsole element or something similar.

As already mentioned, the characteristics of a cushioning element may be influenced in many different ways through the combination of different aspects of the methods described herein and/or through variations of the respective process parameters (e.g. pressure, duration, temperature, number of partitions of the mold, etc.) and/or though different arrangements of the mold used.

According to further embodiments of the invention, the characteristics of a cushioning element manufactured using one of the methods described herein may be further influenced through a suitable selection of the particles of the expanded material.

In particular, particles of an expanded material, which comprise a mixture of at least two kinds of particles that differ in their raw material and/or their size and/or their density and/or their color, may be used in the methods described herein. In particular, one or more of the following materials may be considered as a raw material: expanded ethylene vinyl acetate, expanded thermoplastic urethane, expanded polypropylene, expanded polyamide, expanded polyether block amide, expanded polyoxymethylene, expanded polystyrene, expanded polyethylene, expanded polyoxyethylene, and expanded ethylene propylene diene monomer.

Depending on the selection of the raw materials and designs of the particles, as well as depending on the mixture ratio when using a mixture made of several different particle types, and depending on the manufacturing parameters, different characteristics of the manufactured cushioning elements will arise.

As already mentioned several times, the manufacturing methods described herein may be furthermore used in the manufacture of soles for shoes, in particular midsoles for sports shoes.

Figure 8:
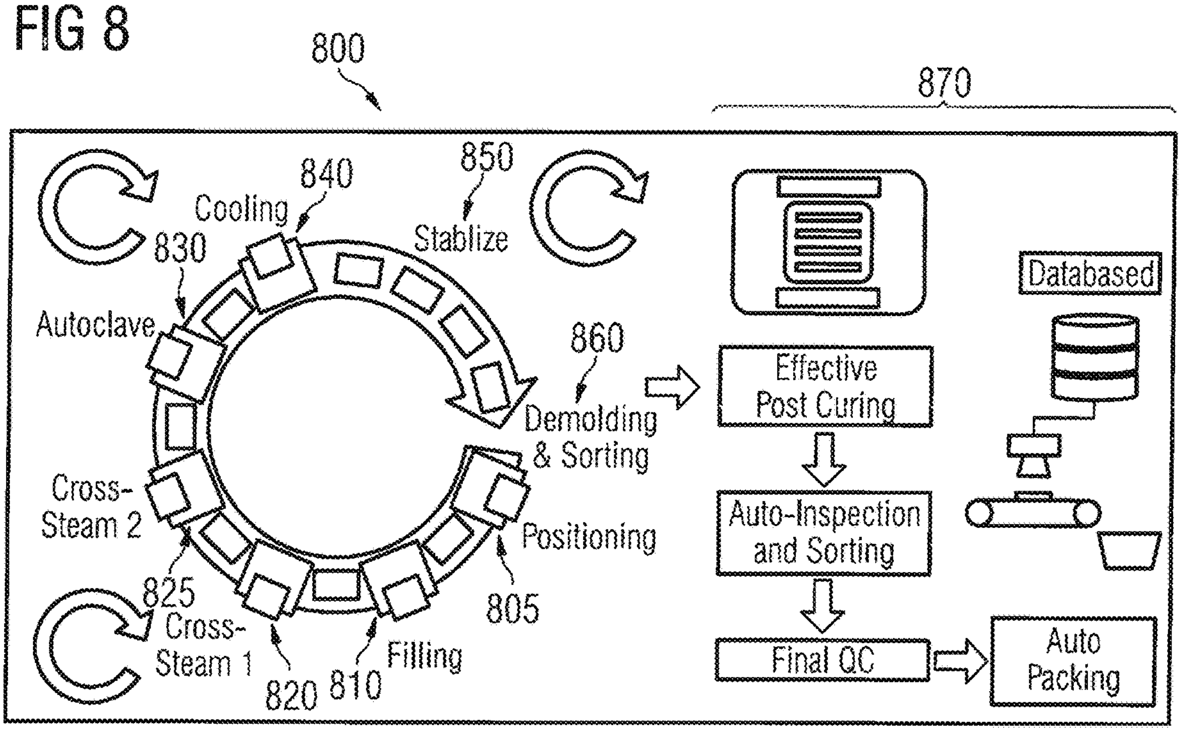
FIGS. 8 and 9 are schematic illustrations of an automated production facility for the manufacture of a cushioning element, according to certain embodiments of the present invention.

Embodiments of an automated production facility 800 is shown in FIG. 8, which represents further embodiments of the present invention. Along such an automated production facility 800, cushioning elements may be manufactured largely automated with one or more of the manufacturing methods described herein, or a combination thereof. For this, the automated production facility 800 preferably has several stations. In one or more embodiments, the automated production facility 800 has at least two of the following stations: a station for arranging a functional element within the mold 805, a loading station for loading the mold with particles of an expanded material 810, a steaming station 820, 825, a heat treatment station 830, a cooling station 840, a stabilization station 850, and a removal station 860.

Depending on which aspects of the manufacturing methods described herein are relevant in the individual case along the automated production facility 800, the individual stations 805, 810, 820, 825, 830, 840, 850, 860 are all, or only a specific number thereof, passed through. An advantage of the manufacturing methods described herein is that the work piece does not, or only very occasionally, need to be removed from the mold and placed into a new mold. This permits an automated production, in which the mold is moved from one station to the next station of the automated production facility 800 for receiving the particles of the expanded material. This onward movement may take place both manually as well as automated and/or under the control of a computer. A computer controlled onward movement may, for example, lead to an increased utilization of the individual stations 805, 810, 820, 825, 830, 840, 850, 860 and a higher production capacity. Moreover, errors in the production process may thus be avoided. Furthermore, the automated production facility 800 may perform a series of further processing steps 870, for example, a subsequent treatment of the manufactured cushioning element, a further processing towards the finished sports apparel, an auto-inspection and final quality control, as well as packaging and addressing the goods.

Figure 9:
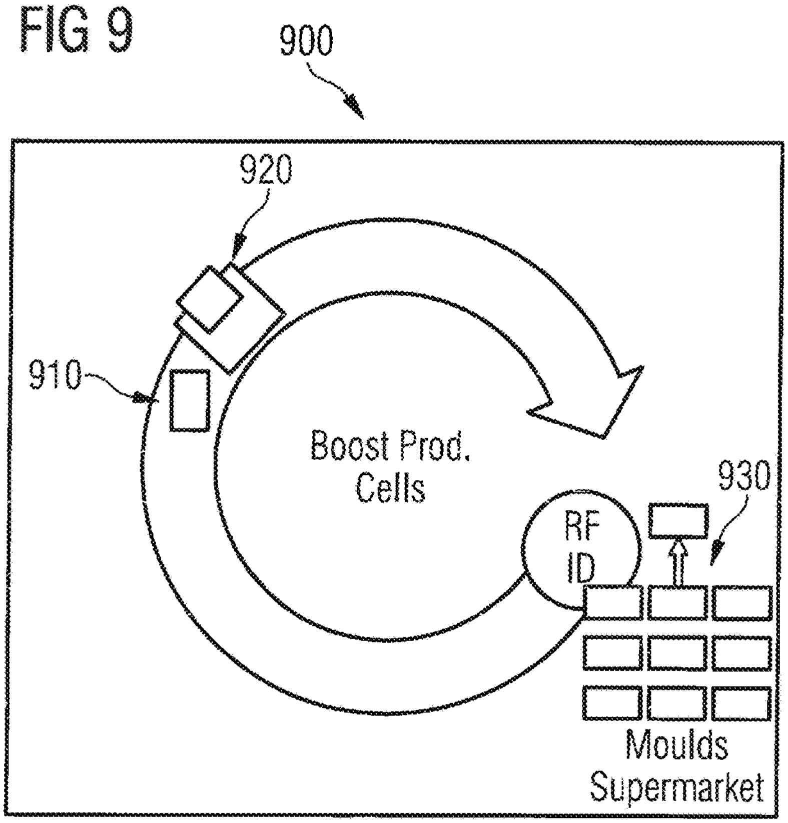

Other embodiments of an automated production facility 900 belonging to the invention, which is outlined in FIG. 9 and has a series of different stations 910, 920, 930, selects the mold for the reception of the particles of the expanded material from a plethora 930 of molds in a computer controlled manner. This makes it possible to customize the manufactured cushioning elements individually in accordance with the wishes and needs of a customer, or rather allowing said customer to choose from a plethora of possible designs themselves, whereupon the cushioning element desired by the customer is automatically manufactured and possibly further processed as already described above.

The customer may, for example, chose the shape, the functional element, the color, the size etc. of the desired cushioning element, or rather of the sports equipment, which comprises the cushioning element. In certain embodiments, the customer may, for example, make their choice at home on a computer or in a sports or sportswear shop, and may for instance communicate or transmit their selection to the automated production facility 900 via the Internet or other communication medium or with the aid of a data carrier, which then carries out the manufacture of the desired product (and also its further processing, packaging, dispatch etc. if necessary). Through the customer selection of specific characteristics of a sole (e.g. more cushioning in several parts of the shoe, harder sole in other parts of the shoe), for instance, the automated production facility 900 is able to automatically select the correct materials, the correct functional element, the correct mold, the correct particle size and density, etc. during the manufacture and then automatically manufacture the cushioning element or respectively the entire end product.

In the following, further examples are described to facilitate the understanding of the invention:

1. Method for manufacturing a cushioning element for sports apparel from randomly arranged particles of an expanded material, comprising:
a. loading a mold with the particles of the expanded material,
b. wherein the particles are loaded into the mold within a stream of a transport liquid and/or a stream of steam.
2. Method according to example 1, wherein the particles of the expanded material are treated within the mold with pressure and/or heat and/or steam.
3. Method according to example 1 or 2, wherein the particles of the expanded material are loaded into the mold under pressure.
4. Method according to example 2 or 3, wherein, prior to treating with pressure and/or heat and/or steam, the transport liquid is at least partially removed from the mold.
5. Method according to one of the examples 2-4, wherein the transport liquid remaining in the mold solidifies under the influence of the pressure and/or heat and/or steam treatment.
6. Method according to one of the examples 2-5, wherein, after conclusion of the pressure and/or heat and/or steam treatment, the liquid and/or the solidified liquid is at least partially dissolved out and/or melted out and/or removed by pressure from the cushioning element.
7. Method for manufacturing a cushioning element for sports apparel from randomly arranged particles of an expanded material, comprising:
a. loading a mold with the particles of the expanded material, and
b. heating at least a part of the wall of the mold to a temperature which at least partially or entirely melts the particles of the expanded material that lie adjacent to this part of the wall of the mold.
8. Method according to example 7, wherein the particles of the expanded material are treated within the mold with pressure and/or heat and/or steam.
9. Method according to example 7 or 8, wherein at least said part of the wall of the mold, which is heated in step b., has a structured surface.
10. Method according to one of the examples 7-9, wherein the at least partially melted particles are so constituted after cooling that they selectively stiffen the cushioning element.
11. Method for manufacturing a cushioning element for sports apparel from randomly arranged particles of an expanded material, comprising:
a. loading a mold with the particles of the expanded material, and
b. coating the particles of the expanded material with a liquid matrix material in order to achieve a substantially even distribution of the particles within the matrix material.
12. Method according to example 11, wherein the particles of the expanded material and/or the matrix material are further treated with pressure and/or heat and/or steam.
13. Method for manufacturing a cushioning element for sports apparel from randomly arranged particles of an expanded material, comprising:
a. positioning of a functional element within a mold, and
b. loading the mold with the particles of the expanded material,
c1. wherein the loading occurs through at least two openings within the mold, and/or
c2. wherein the loading occurs between different movable parts of the mold.
14. Method according to example 13, wherein the particles of the expanded material are treated within the mold with pressure and/or heat and/or steam.
15. Method according to example 13 or 14, wherein the at least two openings are arranged in such a manner that the loaded particles of the expanded material surround the functional element from at least two different sides.
16. Method according to one of the examples 13-15, wherein the functional element comprises a cushioning element manufactured according to the method of example 11 or 12.

17. Method according to one of the examples 13-16, wherein the functional element comprises a foil, in particular a foil comprising thermoplastic urethane.
18. Method according to the preceding example 17, wherein the foil is provided as a container that contains randomly arranged particles of a second expanded material.
19. Method according to one of the examples 13-15 or 17-18, wherein the functional element is free of particles of the expanded material.
20. Method according to one of the preceding examples 1-19, wherein the particles of the expanded material and/or the particles of the second expanded material comprise a mixture of at least two different kinds of particles, which differ in their raw material and/or their size and/or their density and/or their color.
21. Method according to one of the preceding examples 1-20, wherein the particles of the expanded material and/or the particles of the second expanded material comprise one or more of the following materials: expanded ethylene-vinyl-acetate, expanded thermoplastic urethane, expanded polypropylene, expanded polyamide, expanded polyetherblockamide, expanded polyoxymethylene, expanded polystyrene, expanded polyethylene, expanded polyoxyethylene, expanded ethylene-propylene-diene-monomer.
22. Method according to one of the preceding examples 1-21, wherein the cushioning element is provided as a part of a sole for a shoe.
23. Method according to one of the preceding examples 1-22, wherein the individual steps of the method are carried out at two or more stations of an automated production facility.
24. Method according to example 23, wherein the automated production facility comprises at least two of the following stations: a station for positioning a functional element within the mold, a loading station for loading the mold with particles of the expanded material, a steaming station, a heat treatment station, a cooling station, a stabilization station and a removal station.
25. Method according to example 23 or 24, wherein the mold to be loaded with the particles of the expanded material is moved from one station of the automated production facility to the next automatically and/or under the control of a computer.
26. Method according to one of the examples 23-25, wherein the production facility selects the mold to be loaded with the particles of the expanded material from a plurality of molds under the control of a computer.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for the manufacture of a cushioning element for sports apparel from randomly arranged particles of an expanded material, the method comprising:

loading a mold with particles of the expanded material, wherein the mold comprises at least a lower stamp and an upper stamp which can move relative to one another as well as at least one stationary part, and wherein loading the mold comprises the sub-steps of:

moving the lower stamp out of the mold and then loading particles of the expanded material into the mold from above, subsequently moving the lower stamp back into the mold until it has assumed a final position, and further loading the mold with particles of the expanded material and/or closing the mold.

2. The method according to claim 1, further comprising the following step, prior to loading the mold with particles of the expanded material:

positioning a functional element within the mold.

3. The method according to claim 2, wherein the final position of the lower stamp is defined relative to the functional element.

4. The method according to claim 2, wherein during the moving of the lower stamp back into the mold until it has assumed its final position, any excess particles of the expanded material which are situated between the lower stamp and the functional element due to the loading with a further opened lower stamp in any previous step are forced to the side, upwards, or a combination thereof.

5. The method according to claim 4, wherein the functional element is surrounded by particles at least from above and from below after conclusion of the loading of the mold.

6. The method according to claim 1, wherein the particles of the expanded material are loaded into the mold through openings in the upper stamp.

7. The method according to claim 1, wherein the particles of the expanded material are treated within the mold with pressure, heat, steam, or a combination thereof.

8. The method according to claim 2, wherein the functional element comprises a foil.

9. The method according to claim 8, wherein the foil comprises thermoplastic urethane.

10. The method according to claim 9, wherein the foil is provided as a container that contains randomly arranged particles of a second expanded material.

11. The method according to claim 10, wherein the container is provided as an insert within the cushioning element.

12. The method according to claim 11, wherein cushioning element is a shoe sole or part of a shoe sole, and wherein the insert is arranged in a forefoot region or in a heel region of the sole or the part of the sole.

13. The method according to claim 2, wherein the functional element is free from particles of expanded material.

14. The method according to claim 1, wherein the particles of the expanded material comprise one or more of the following materials: expanded thermoplastic urethane, expanded polyamide, expanded polyether block amide.

15. The method according to claim 1, wherein the particles of the expanded material comprise a mixture of at least two different kinds of particles, which differ in at least one of their raw material, size, density, or combinations thereof.

16. The method according to claim 10, wherein the particles of the second expanded material comprise a mixture of at least two different kinds of particles, which differ in at least one of their raw material, size, density, or combinations thereof.

* * * * *